US00RE43126E

(19) United States
(12) Reissued Patent
Hayashi et al.

(10) Patent Number: US RE43,126 E
(45) Date of Reissued Patent: Jan. 24, 2012

(54) OPTICAL PICKUP HEAD AND INFORMATION RECORDING/REPRODUCING DEVICE

(75) Inventors: Hideki Hayashi, Nara (JP); Sadao Mizuno, Osaka (JP); Daisuke Ogata, Hyogo (JP); Shin-ichi Kadowaki, Hyogo (JP); Kousei Sano, Osaka (JP); Jouji Anzai, Osaka (JP); Akihiro Yasuda, Fukuoka (JP)

(73) Assignee: Panasonic Corporation, Osaka (JP)

(21) Appl. No.: 11/529,689

(22) Filed: Sep. 28, 2006

Related U.S. Patent Documents

Reissue of:
(64) Patent No.: 6,798,723
Issued: Sep. 28, 2004
Appl. No.: 10/163,443
Filed: Jun. 4, 2002

(30) Foreign Application Priority Data

Jun. 4, 2001 (JP) ..... 2001-167968
Jun. 13, 2001 (JP) ..... 2001-178080
Apr. 5, 2002 (JP) ..... 2001-104425

(51) Int. Cl.
*G11G 7/00* (2006.01)
(52) U.S. Cl. ..... 369/44.23; 369/44.42
(58) Field of Classification Search ..... 369/112.01, 369/112.1, 44.23, 44.24, 44.37, 44.41, 44.42, 369/112.03, 112.12, 112.02, 109.01, 112.15, 369/120, 121
See application file for complete search history.

(56) References Cited

U.S. PATENT DOCUMENTS

| | | | | |
|---|---|---|---|---|
| 4,797,870 | A | 1/1989 | Nagai et al. | |
| 5,353,267 | A * | 10/1994 | Katayama | 369/13.32 |
| 5,414,451 | A | 5/1995 | Sugiyama et al. | |
| 5,764,606 | A | 6/1998 | Fukumoto et al. | |
| 5,828,643 | A * | 10/1998 | Takeda et al. | 369/112.12 |
| 5,923,632 | A | 7/1999 | Kato et al. | |
| 6,298,028 | B1 | 10/2001 | Arikawa et al. | |
| 6,396,790 | B2 | 5/2002 | Arikawa et al. | |
| 7,212,556 | B1 | 5/2007 | Kume et al | |
| 7,239,603 | B1 | 7/2007 | Ogata | |
| 2002/0012302 | A1 | 1/2002 | Arikawa et al. | |

(Continued)

FOREIGN PATENT DOCUMENTS

JP 63-78350 4/1988

(Continued)

*Primary Examiner* — Nabil Hindi
(74) *Attorney, Agent, or Firm* — Hamre, Schumann, Mueller & Larson, P.C.

(57) ABSTRACT

An optical pickup head is provided with a light source, a diffracting means for creating a plurality of diffracted beams, a converging means for focusing the diffracted beams onto an optical storage medium, a beam branching means for branching the plurality of beams reflected by the optical storage medium, and an optical detecting means for outputting a signal corresponding to the amount of light of the received beams. The optical detecting means has main beam light receiving portions and sub-beam light receiving portions. The amount of light of the first or higher order diffracted beams when they are substantially focused on and reflected by a focus plane of the plurality of information recording planes is equal to or greater than the amount of light of the zero order diffracted beam when it is reflected without focusing by a non-focus plane other then the focus plane of the plurality of information recording planes. The invention provides an optical pickup head where offset is not generated in the TE signals even during tracking with the objective lens when a two-layered disk is used.

73 Claims, 18 Drawing Sheets

U.S. PATENT DOCUMENTS

| | | | | |
|---|---|---|---|---|
| 2002/0101802 | A1* | 8/2002 | Ogasawara et al. | 369/44.37 |
| 2004/0213315 | A1 | 10/2004 | Kume et al. | |
| 2006/0239311 | A1 | 10/2006 | Kume et al. | |

FOREIGN PATENT DOCUMENTS

| | | |
|---|---|---|
| JP | 5-101398 | 4/1993 |
| JP | 9-161295 | 6/1997 |
| JP | 2000-11398 | 1/2000 |
| JP | 2000-353328 | 12/2000 |
| JP | 2001-068784 | 3/2001 |
| JP | 2001-184705 | 7/2001 |
| JP | 2002-025104 | 1/2002 |
| WO | 96/06427 | 2/1996 |
| WO | 96/20473 | 7/1996 |

* cited by examiner

OPTICAL PICKUP HEAD AND INFORMATION RECORDING/REPRODUCING DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an optical pickup head used in a apparatus for recording, reproducing, or erasing information on an optical storage medium, and to an information recording/reproducing apparatus.

2. Description of Related Art

Optical memory technologies using optical storage media with a pit-shaped pattern, that are storage media of high density and large capacity, are increasingly adopted for digital audio disks, video disks, text file disks, and data files, for example. In recent years, high-density, large capacity optical storage media known as DVDs have been put into practical use and have garnered widespread attention as information media capable of handling large quantities of information, such as moving pictures. These DVD optical storage media are recorded and reproduced using a so-called red semiconductor laser that emits laser light of a wavelength near 650 nm.

A conventional optical pickup head in an optical disk system capable of recording and reproducing is described using FIG. 22.

A semiconductor laser light source 101, serving as the light source, emits a linearly polarized divergent beam 700 with a wavelength $\lambda_2$ of 650 nm. The divergent beam 700 emitted from the semiconductor laser light source 101 is incident on a diffraction grating 510 and split into three beams of zero order, −1st order, and +1st order diffracted light. The zero order diffracted beam is a main beam 700a for recording/reproducing information and the +1st and −1st order diffracted beams are sub-beams 700b and 700c used in a differential push-pull method (hereinafter, referred to as DPP) to detect tracking error (hereinafter, referred to as TE) signals stably. The ratio of the diffraction efficiency of the zero order diffracted beam to either one of the 1st order diffracted beams is ordinarily set from 12:1 to 20:1, and here it is 20:1. Accordingly, the sub-beams 700b and 700c are prevented from affecting the main beam 700a, and unintentional recording on an optical storage medium 410 can be avoided.

The three beams created by the diffraction grating 510, that is, the main beam 700a and the sub-beams 700b and 700c, pass through a polarizing beam splitter 520 and are converted into parallel beams by a collimating lens 530 with a focal length of 15 mm. The parallel beams pass through a quarter wavelength plate 540 and are converted into circularly polarized light, after which they are converted into convergent beams by an objective lens 560 with a 3 mm focal length. The opening of the objective lens 560 is restricted by an aperture 550, and its numerical aperture NA is 0.6.

The optical storage medium 410 is provided with a transparent substrate 410a and an information recording plane 410b, and the thickness of the transparent substrate 410a is 0.6 mm. The convergent beam from the objective lens 560 passes through the transparent substrate 410a and is focused on the information recording plane 410b.

FIG. 23 shows the relationship between the tracks and the beams on the optical storage medium. As shown in FIG. 23, tracks, which are a plurality of continuous grooves, are formed on the information recording plane 410b of the optical storage medium 410 (FIG. 22). Tracks $T_{m-1}$, $T_m$, and $T_{m+1}$ are lined up in order, and the track pitch $P_2$, which is the distance between the track $T_{m-1}$ and the track $T_m$ and between the track $T_m$ and the track $T_{m+1}$, is 0.74 μm. The beams are arranged such that when the main beam 700a is positioned on the track $T_m$, the sub-beams 700b and 700c are positioned between the tracks $T_m$ and $T_{m-1}$ and the tracks $T_m$ and $T_{m+1}$, respectively. Consequently, there is a 0.37 μm wide spacing $L_2$ between the main beam 700a and the sub-beams 700b and 700c in the direction perpendicular to the track $T_m$.

The main beam 700a and the sub-beams 700b and 700c focused on the information recording plane 410b are reflected, and after passing through the objective lens 560 and the quarter wavelength plate 540 and being converted into linearly polarized light with a polarization that is rotated by 90° with respect to that of the incident path, they pass through the collimating lens 530 and are converged into convergent light. This convergent light is reflected by the polarizing beam splitter 520, passes through a cylindrical lens 570, and is incident on an optical detector 300. Astigmatism is imparted on the main beam 700a and the sub-beams 700b and 700c when they pass through the cylindrical lens 570.

The optical detector 300 has eight light receiving portions 300a, 300b, 300c, 300d, 300e, 300f, 300g, and 300h. The light receiving portions 300a, 300b, 300c, and 300d are for receiving the main beam 700a, the light receiving portions 300e and 300f are for receiving the sub-beam 700b, and the light receiving portions 300g and 300h are for receiving the sub-beam 700c. The light receiving portions 300a, 300b, 300c, 300d, 300e, 300f, 300g, and 300h each output a current signal corresponding to the amount of light received.

Using each of the signals output from the light receiving portions 300a, 300b, 300c, and 300d for receiving the main beam 700a, it is possible to obtain focus error (hereinafter, referred to as FE) signals through the astigmatism method, TE signals through a phase difference method, TE signals through a push-pull method, and information (hereinafter, referred to as RF) signals recorded on the optical storage medium. Also, when recording/reproducing continuous groove disks such as DVD-RW disks, TE signals can be obtained through DPP by jointly using the signals output from the light receiving portions 300e, 300f, 300g, and 300h for receiving the sub-beams 700b and 700c. After being amplified to a desired level and phase compensated, the FE signals and the TE signals are supplied to actuators 910 and 920, and based on these signals, focusing and tracking control are performed.

In DVDs, ROM disks for read only are standardized as two-layered disks provided with two information planes. Information can be read out from these two-layered disks without any problems by detecting the TE signals through the phase difference method using the conventional optical pickup head.

Moreover, at the research and development level, there have been many publications of research results for two-layered recordable disks having two information recording planes (hereinafter, referred to as two-layered recording disks). Initially, no information is written on two-layered recording disks, so TE signals cannot be detected by a phase difference method. For this reason, the TE signals are detected by DPP, as is the case with single-layered recordable disks.

However, even if two-layered recording disks are used with the above-mentioned conventional optical pickup head and TE signals are detected by DPP, there is the problem that letting the objective lens perform tracking generates an uncorrectable offset in the TE signals.

This is because when information is recorded/reproduced with one of the information recording planes of the two layers (hereinafter, that information recording plane is referred to as the focus plane), a portion of the beam forming a focal point on the focus plane is reflected and a portion passes through the focus plane and arrives at the other information recording plane (hereinafter, that information recording plane is referred to as the non-focus plane). This beam is out of focus on the non-focus plane and is reflected by the non-focus plane toward the optical detector. The beam reflected by the non-focus plane cannot be fully cancelled during detection of the TE signals by DPP due to aberration and variations in the amount of beam light, for example. For this reason, tracking with the objective lens leads to fluctuations in the amount that cannot be cancelled and an uncorrectable offset is caused in the TE signals.

This results in displacement from the track and partially erases information recorded on adjacent tracks when recording information to the optical storage medium, which causes the problem that information recoded on the optical storage medium can no longer be read out with fidelity.

It is an object of the present invention to provide an optical pickup head with which offset is not caused in the TE signals even when tracking with the objective lens in a case where a two-layered recording disk is used. It is a further object of the present invention to provide an information recording/reproducing apparatus using this optical pickup head.

SUMMARY OF THE INVENTION

An optical pickup head of the present invention is provided with a light source for emitting a light beam, a diffracting means for creating a plurality of diffracted beams from the beam emitted by the light source, a converging means for focusing the plurality of diffracted beams from the diffracting means onto an optical storage medium, a beam branching means for branching the plurality of beams of the plurality of diffracted beams focused onto the optical storage medium and reflected by the optical storage medium, and an optical detecting means for receiving the beams branched at the beam branching means and outputting a signal corresponding to the amount of light of the received beams; wherein the optical detecting means has main beam light receiving portions for receiving zero order diffracted beams and sub-beam light receiving portions for receiving first or higher order diffracted beams of the plurality of diffracted beams that are focused; the optical storage medium has a plurality of information recording planes and guide grooves are formed in at least one of the information recording planes; and the amount of light of the first or higher order diffracted beams focused by the converging means when they are substantially focused on and reflected by a focus plane of the plurality of information recording planes is equal to or greater than the amount of light of the zero order diffracted beam focused by the converging means when it is reflected without focusing thereon by a non-focus plane other than the focus plane of the plurality of information recording planes. Thus, there is the effect that even if a two-layered disk is used for the optical recording medium, there is no offset generated in the tracking error signals, even during tracking with the objective lens.

Another optical pickup head of the present invention is provided with a light source for emitting a light beam, a diffracting means for creating a plurality of diffracted beams from the beam emitted by the light source, a converging means for focusing the plurality of diffracted beams from the diffracting means onto an optical storage medium, a beam branching means for branching a plurality of beams of the plurality of diffracted beams focused onto the optical storage medium and reflected by the optical storage medium, and an optical detecting means for receiving the beams branched at the beam branching means and outputting a signal corresponding to the amount of light of the received beams; wherein the optical storage medium has a plurality of information recording planes, guide grooves are formed in at least one of the information recording planes, and information is recorded on the guide grooves or between the guide grooves; and the relationship $10\cdot\eta_s \geqq \eta_m$ is fulfilled, where $\eta_m$ is a diffraction efficiency of a zero order diffracted beam of the diffracted beams created by the diffracting means and $\eta_s$ is a diffraction efficiency of first or higher order diffracted beams.

Another optical pickup head of the present invention is provided with a light source for emitting a light beam, a diffracting means for creating a plurality of diffracted beams from the beam emitted by the light source, a converging means for focusing the plurality of diffracted beams from the diffracting means onto an optical storage medium, a beam branching means for branching a plurality of beams of the plurality of diffracted beams focused onto the optical storage medium and reflected by the optical storage medium, and an optical detecting means for receiving the beams branched at the beam branching means and outputting a signal corresponding to the amount of light of the received beams; wherein the optical detecting means has main beam light receiving portions for receiving zero order diffracted beams, and sub-beam light receiving portions for receiving first or higher order diffracted beams, of the plurality of diffracted beams that are focused; the optical storage medium has a plurality of information recording planes and guide grooves are formed in at least one of the information recording planes; and all of the sub-beam light receiving portions are arranged within the image formed on the optical detecting means by the light of the zero order diffracted beam focused by the converging means that is reflected without focusing by the non-focus plane of the plurality of information recording planes.

Another optical pickup head of the present invention is provided with a light source for emitting a light beam, a diffracting means for creating a plurality of diffracted beams from the beam emitted by the light source, a converging means for focusing the plurality of diffracted beams from the diffracting means onto an optical storage medium, a beam branching means for branching a plurality of beams of the plurality of diffracted beams focused onto the optical storage medium and reflected by the optical storage medium, and an optical detecting means for receiving the beams branched at the beam branching means and outputting a signal corresponding to the amount of light of the received beams; wherein the optical detecting means has main beam light receiving portions for receiving zero order diffracted beams and sub-beam light receiving portions for receiving first or higher order diffracted beams of the plurality of diffracted beams that are focused; the optical storage medium has a plurality of information recording planes and guide grooves are formed in at least one of the information recording planes; and the relationship $S_1 \leqq 4\cdot\pi\cdot(d\cdot NA\cdot\alpha)^2\cdot\eta_s/\eta_m$ is fulfilled, where $\eta_m$ is a diffraction efficiency of a zero order diffracted beam of the diffracted beams created by the diffracting means and $\eta_s$ is a diffraction efficiency of first or higher order diffracted beams, NA is a numerical aperture of the optical storage medium side of the converging means, $\alpha$ is a lateral magnification of an optical system on a return path from the optical storage medium to the optical detecting means, d is an optical spacing between two information recording planes of the optical storage medium, and $S_1$ is an area of one sub-beam light receiving portion.

Another optical pickup head of the present invention is provided with a light source for emitting a light beam, a diffracting means for creating a plurality of diffracted beams from the beam emitted by the light source, a converging means for focusing the plurality of diffracted beams from the diffracting means onto an optical storage medium, a beam branching means for branching a plurality of beams of the plurality of diffracted beams focused onto the optical storage medium and reflected by the optical storage medium, and an optical detecting means for receiving the beams branched at the beam branching means and outputting a signal corresponding to the amount of light of the received beams; wherein the optical detecting means has main beam light receiving portions for receiving zero order diffracted beams and sub-beam light receiving portions for receiving first or higher order diffracted beams of the plurality of diffracted beams that are focused; the optical storage medium has a plurality of information recording planes, and guide grooves are formed in at least one of the information recording planes; and the relationship $S_1 \leqq 4\cdot\pi\cdot(d\cdot NA\cdot\alpha)^2\cdot\eta_s/\eta_m\cdot R_{fo}/R_{dfo}$ is fulfilled, where $\eta_m$ is a diffraction efficiency of the zero order diffracted beam and $\eta_s$ is a diffraction efficiency of first or higher order diffracted beams of the diffracted beams created by the diffracting means, $R_{fo}$ is an effective reflectance of the focus plane among the information recording planes onto which the beam focused by the converging means substantially forms a focal point, $R_{dfo}$ is an effective reflectance of the non-focus plane other than the focus plane of the plurality of information recording planes, NA is a numerical aperture of the optical storage medium side of the converging means, $\alpha$ is a lateral magnification of an optical system on a return path from the optical storage medium to the optical detecting means, d is an optical spacing between two information recording planes of the optical storage medium, and $S_1$ is one area of a sub-beam light receiving portion.

Another optical pickup head of the present invention is provided with a light source for emitting a light beam, a diffracting means for creating a plurality of diffracted beams from the beam emitted from the light source, a converging means for focusing the plurality of diffracted beams from the diffracting means onto an optical storage medium, a beam branching means for branching a plurality of beams of the plurality of diffracted beams focused on the optical storage medium and reflected by the optical storage medium into two beams, an astigmatism imparting means for imparting astigmatism on a first beam branched at the beam branching means, a beam splitting means for further splitting a second beam branched at the beam branching means into two beams, a first optical detecting means for receiving the beam from the astigmatism imparting means and outputting a signal corresponding to the amount of light of the received beam, and a second optical detecting means for receiving the beams from the beam splitting means and outputting a signal corresponding to the amount of light of the received beams; wherein the optical storage medium has a plurality of information recording planes, and guide grooves are formed into at least one of the information recording planes; and the beam splitting means splits the second beam in a direction parallel to the guide grooves.

It is also possible that the diffracting means creates a zero order diffracted beam and first or higher order diffracted beams, the first beam includes a zero order diffracted beam and the first or higher order diffracted beams, the first optical detecting means has four light receiving portions, and the zero order diffracted beam and the first or higher order diffracted beams are received by the light receiving portions overlappingly.

It is also possible that the first optical detecting means and the second optical detecting means each have light receiving portions for receiving the plurality of diffracted beams that have been focused, and all of the light receiving portions of the first optical detecting means and the second optical detecting means are arranged within the images that are formed on the first optical detecting means and the second optical detecting means by the light of the zero order diffracted beam focused by the converging means that is reflected without forming a focal point by the non-focus plane of the plurality of information recording planes.

Further, the beam splitting means can include a diffraction element.

Further, the beam splitting means can include a prism.

Further, the beams can be imaged substantially in focus on the first optical detecting means and the second optical detecting means.

Further, the size of the light receiving portions can be not less than three and not more than ten times that of an Airy disk.

Another optical pickup head of the present invention is provided with a light source for emitting a light beam, a diffracting means for creating a zero order diffracted beam and first or higher order diffracted beams from the beam emitted from the light source, a converging means for focusing the zero order diffracted beam and the first or higher order diffracted beams from the diffracting means onto an optical storage medium, a beam splitting means for respectively splitting into two beams the zero order diffracted beam and the first or higher order diffracted beams focused on the optical storage medium and reflected by the optical storage medium, and an optical detecting means for receiving the beams split by the beam splitting means and outputting a signal corresponding to the amount of light of the received beams; wherein the optical detecting means has a plurality of light receiving portions positioned lined up in a row; the optical storage medium has a plurality of information recording planes and guide grooves are formed in at least one of the information recording planes; and the beam splitting means splits the beams with a splitting axis substantially parallel to the guide grooves.

Further, it is also possible that the light receiving portion for receiving the zero order diffracted beam of one of the beams split by the beam splitting means is positioned to be sandwiched between the light receiving portion for receiving the zero order diffracted beam of the other beam split by the beam splitting means and the light receiving portion for receiving the first or higher order diffracted beams of the other beam split by the beam splitting means.

Further, it is also possible that the spacing between the images formed on the optical detecting means by the zero order diffracted beam and the first or higher order diffracted beam of either one of the beams split by the beam splitting means is wider than the spacing between the images formed on the optical detecting means by the two zero order diffracted beams split by the beam splitting means.

Further, the beam splitting means can include a diffraction element.

Further, the beam splitting means can include a prism.

Further, the beams can be imaged substantially in focus on the optical detecting means.

Further, the size of the light receiving portions can be not less than three and not more than ten times that of an Airy disk.

Another optical pickup head of the present invention is provided with a light source for emitting a light beam, a diffracting means for creating a plurality of diffracted beams from the beam emitted from the light source, a converging means for focusing the plurality of diffracted beams from the diffracting means onto an optical storage medium, a beam branching means for branching a plurality of beams of the plurality of diffracted beams focused on the optical storage medium and reflected by the optical storage medium, an astigmatism imparting means for imparting astigmatism on the beams branched by the beam branching means, and an optical detecting means for receiving the beams imparted with astigmatism by the astigmatism imparting means and outputting a signal corresponding to the amount of light of the received beams; wherein the optical detecting means has main beam light receiving portions for receiving the zero order diffracted beams and sub-beam light receiving portions for receiving the first or higher order diffracted beams of the plurality of diffracted beams that are focused; the optical storage medium has a plurality of information recording planes and guide grooves are formed in at least one of the information recording planes; and the relationship $S_1 \cdot \eta_m \cdot R_{dfo}/(4 \cdot \pi \cdot d^2 \cdot NA^2 \cdot \eta_s \cdot R_{fo}) \leqq \alpha \leqq (Z_0/2/\Delta z)^{1/2}$ is fulfilled, and $\Delta z$ is in the range of three to ten times $\lambda/2/NA^2$, where $Z_0$ is an astigmatic difference imparted by the astigmatism imparting means, $\eta_m$ is a diffraction efficiency of the zero order diffracted beam and $\eta_s$ is a diffraction efficiency of first or higher order diffracted beams of the diffracted beams created by the diffracting means, $R_{fo}$ is an effective reflectance of the focus plane of the information recording planes onto which the beam focused by the converging means is substantially focused, $R_{dfo}$ is an effective reflectance of the non-focus plane other than the focus plane of the plurality of information recording planes, NA is a numerical aperture of the optical storage medium side of the converging means, $\alpha$ is a lateral magnification of an optical system on a return path from the optical storage medium to the optical detecting means, $\lambda$ is a wavelength of the beam emitted from the light source, d is an optical spacing between two information recording planes of the optical storage medium, and $S_1$ is an area of one sub-beam light receiving portion.

Another optical pickup head of the present invention is provided with a light source for emitting a light beam, a diffracting means for creating a plurality of diffracted beams from the beam emitted from the light source, a converging means for focusing the plurality of diffracted beams from the diffracting means onto an optical storage medium, a beam splitting means for splitting beams of the plurality of diffracted beams focused onto the optical storage medium and reflected by the optical storage medium into two beams having different focal points, and an optical detecting means for receiving the beams split by the beam splitting means and outputting a signal corresponding to the amount of light of the received beams; wherein the optical detecting means has main beam light receiving portions for receiving zero order diffracted beams and sub-beam light receiving portions for receiving first or higher order diffracted beams of the plurality of diffracted beams that are focused; the optical storage medium has a plurality of information recording planes and guide grooves are formed in at least one of the information recording planes; and the relationship $S_1 \cdot \eta_m \cdot R_{dfo}/(4 \cdot \pi \cdot d^2 \cdot NA^2 \cdot \eta_s \cdot R_{fo}) \leqq \alpha \leqq (Z_0/2/\Delta z)^{1/2}$ is fulfilled, and $\Delta z$ is in the range of three to ten times $\lambda/2/NA^2$, where $Z_0$ is the spacing between the two focal points given the two beams split by the beam splitting means, $\eta_m$ is a diffraction efficiency of the zero order diffracted beam and $n_s$ is a diffraction efficiency of the first or higher order diffracted beams of the diffracted beams created by the diffracting means, $R_{fo}$ is an effective reflectance of the focus plane of the information recording planes onto which the beams focused by the converging means are substantially focused, $R_{dfo}$ is an effective reflectance of the non-focus plane other than the focus plane of the plurality of information recording planes, NA is a numerical aperture of the optical storage medium side of the converging means, $\alpha$ is a lateral magnification of an optical system on a return path from the optical storage medium to the optical detecting means, $\lambda$ is a wavelength of the beam emitted from the light source, d is an optical spacing between two information recording planes of the optical storage medium, and $S_1$ is an area of one sub-beam light receiving portion.

Another optical pickup head of the present invention is provided with a light source for emitting a light beam, a diffracting means for creating a plurality of diffracted beams from the beam emitted from the light source, a converging means for focusing the plurality of diffracted beams from the diffracting means onto an optical storage medium, a beam splitting means for splitting the plurality of diffracted beams focused on the optical storage medium and then reflected by the optical storage medium into two beams, an optical detecting means for receiving the beams split by the beam splitting means and outputting a signal corresponding to the amount of light of the received beams, and an astigmatism imparting means for imparting astigmatism on beams on their path from the optical storage medium to the optical detecting means; wherein the optical detecting means has main beam light receiving portions for receiving the zero order diffracted beams and sub-beam light receiving portions for receiving the first or higher order diffracted beams of the plurality of diffracted beams that are focused; the optical storage medium has a substrate of refractive index n and a plurality of information recording planes and guide grooves are formed in at least one of the information recording planes; and the relationship $S_1 \cdot \eta_m \cdot R_{dfo}/(4 \cdot \pi \cdot d^2 \cdot NA^2 \cdot \eta_s \cdot R_{fo}) \leqq \alpha \leqq (Z_0 \cdot n^3/\Delta t/(n^2-1)/NA^2)^{1/2}$ is fulfilled, and $\Delta t$ is in the range of five to thirty times $\lambda/NA^4$, where $Z_0$ is an astigmatic difference imparted by the astigmatism imparting means, $\eta_m$ is a diffraction efficiency of the zero order diffracted beam and $\eta_s$ is a diffraction efficiency of the first or higher order diffracted beams of the diffracted beams created by the diffracting means, $R_{fo}$ is an effective reflectance of the focus plane of the information recording planes onto which the beams focused by the converging means substantially form a focal point, $R_{dfo}$ is an effective reflectance of the non-focus plane other than the focus plane of the plurality of information recording planes, NA is a numerical aperture of the optical storage medium side of the converging means, $\alpha$ is a lateral magnification of an optical system on a return path from the optical storage medium to the optical detecting means, $\lambda$ is a wavelength of the beam emitted from the light source, d is an optical spacing between two information recording planes of the optical storage medium, and $S_1$ is an area of one sub-beam light receiving portion.

Another optical pickup head of the present invention is provided with a light source for emitting a light beam, a diffracting means for creating a plurality of diffracted beams from the beam emitted from the light source, a converging means for focusing the plurality of diffracted beams from the diffracting means onto an optical storage medium, a first beam splitting means for splitting the beams of the plurality of diffracted beams focused on the optical storage medium and reflected by the optical storage medium into two beams, an optical detecting means for receiving the beams split by the first beam splitting means and outputting a signal corresponding to the amount of light of the received beams, and a second beam splitting means for splitting the beams on an optical path from the optical storage medium to the optical detecting means into two beams of different focal points; wherein the optical detecting means has main beam light receiving portions for receiving the zero order diffracted beams and sub-beam light receiving portions for receiving the first or higher order diffracted beams of the plurality of diffracted beams that are focused; the optical storage medium has a substrate of refractive index n and a plurality of information recording planes and guide grooves are formed in at least one of the information recording planes; and the relationship $S_1 \cdot \eta_m \cdot R_{dfo}/(4 \cdot \pi \cdot d^2 \cdot NA^2 \cdot \eta_s \cdot R_{fo}) \leqq \alpha \leqq (Z_0 \cdot n^3/\Delta t/(n^2-1)/NA^2)^{1/2}$ if fulfilled, and $\Delta t$ is in the range of five to thirty times $\lambda/NA^4$, where $Z_0$ is the spacing between the two focal points given the two beams split by the second beam splitting means, $\eta_m$ is a diffraction efficiency of the zero order diffracted beam and $\eta_s$ is a diffraction efficiency of the first or higher order diffracted beams of the diffracted beams created by the diffracting means, $R_{fo}$ is an effective reflectance of the focus plane of the information recording planes onto which the beams focused by the converging means substantially form a focal point, $R_{dfo}$ is an effective reflectance of the non-focus plane other than the focus plane of the plurality of information recording planes, NA is a numerical aperture of the optical storage medium side of the converging means, $\alpha$ is a lateral magnification of an optical system on a return path from the optical storage medium to the optical detecting means, $\lambda$ is a wavelength of the beam emitted by the light source, d is an optical spacing between two information recording planes of the optical storage medium, and $S_1$ is one area of sub-beam light receiving portion.

Another optical pickup head of the present invention is provided with a light source for emitting a light beam, a diffracting means for creating a plurality of diffracted beams from the beam emitted from the light source, a converging means for focusing the plurality of diffracted beams from the diffracting means onto an optical storage medium, a beam splitting means for splitting a plurality of beams of the plurality of diffracted beams focused on the optical storage medium and reflected by the optical storage medium, and an optical detecting means for receiving the beams split by the beam splitting means and outputting a signal corresponding to the amount of light of the received beams; wherein the optical storage medium has a plurality of information recording planes and guide grooves are formed in at least one of the information recording planes; and the semiconductor laser light source is formed on a substrate positioned such that it is substantially parallel to the guide grooves formed in the one or more information recording planes, and emits spontaneously emitted light from a location different from the location from which the laser beam is emitted.

Further, the substrate of the semiconductor laser light source can be made of sapphire.

Further, the substrate of the semiconductor laser light source can be made of gallium nitride.

Another optical pickup head of the present invention is provided with a light source for emitting a light beam, a diffracting means for creating a plurality of diffracted beams from the beam emitted from the light source, a converging means for focusing the plurality of diffracted beams from the diffracting means onto an optical storage medium, and an optical detecting means for receiving the beams of the plurality of diffracted beams focused on the optical storage medium and reflected by the optical storage medium and outputting a signal corresponding to the amount of light of the received beams; wherein the optical detecting means has main beam light receiving portions for receiving zero order diffracted beams and sub-beam light receiving portions for receiving first or higher order diffracted beams of the plurality of diffracted beams that are focused; and dummy light receiving portions for preventing cross-talk between the main beam light receiving portions and the sub-beam light receiving portions are provided between the main beam light receiving portions and the sub-beam light receiving portions.

Another optical pickup head of the present invention is provided with a light source for emitting a light beam, a diffracting means for creating a plurality of diffracted beams from the beam emitted from the light source, a converging means for focusing the plurality of diffracted beams from the diffracting means onto an optical storage medium, and an optical detecting means for receiving beams of the plurality of diffracted beams focused onto the optical storage medium and reflected by the optical storage medium and outputting a signal corresponding to the amount of light of the received beams; wherein the optical detecting means has two main beam light receiving portions for receiving the zero order diffracted beams and four sub-beam light receiving portions for receiving the first or higher order diffracted beams of the plurality of diffracted beams that are focused; and when $T_1$ and $T_2$ are the signals output from the main beam light receiving portions and $T_3$, $T_4$, $T_5$, and $T_6$ are the signals output from the sub-beam light receiving portions, then tracking error signals are detected by calculating $(T_1-T_2)/(T_1+T_2)-k[\{(T_3-T_4)+(T_5-T_6)\}/(T_1+T_2)]$ (wherein k is a constant).

Another optical pickup head of the present invention is provided with a light source for emitting a light beam, a diffracting means for creating a plurality of diffracted beams from the beam emitted from the light source, a converging means for focusing the plurality of diffracted beams from the diffracting means onto an optical storage medium, a beam branching means for branching a plurality of beams of the plurality of diffracted beams focused on the optical storage medium and reflected by the optical storage medium, and an optical detecting means for receiving the beams branched at the beam branching means and outputting a signal corresponding to the amount of light of the received beams; wherein the optical detecting means has two light receiving portions; the optical storage medium has a first information recording plane and a second information recording plane and guide grooves are formed in the first information recording plane; and wherein, if the diffracted beams focused by the converging means form a focal point on the first information recording plane and do not form a focal point on the second information recording plane, then tracking error signals are detected by calculating $(T_{f1}+T_{s1}-T_{f2}-T_{s2})/(T_{f1}+T_{s1}+T_{f2}+T_{s2})$ and a relationship $T_{f1}+T_{f2} \geqq 5 \cdot (T_{s1}+T_{s2})$ is fulfilled, wherein $T_{f1}$ and $T_{f2}$ are signals output from the two light receiving portions when the beams reflected by the first information recording plane are received by the optical detecting means, and $T_{s1}$ and $T_{s2}$ are signals output from the two light receiving portions when the beams reflected by the second information recording plane are received by the optical detecting means.

Further, a first light focusing means for converging the beams received by the first optical detecting means is provided on the light path from the optical storage medium to the first optical detecting means, a second light focusing means for converging the beams received by the second optical detecting means is provided on the light path from the optical storage medium to the second optical detecting means and the first and second light focusing means have a convex lens and a concave lens respectively.

Further, a light focusing means for converging the beams received by the optical detecting means is provided on the light path from the optical storage medium to the optical detecting means, and the light focusing means has a convex lens and a concave lens.

An information recording and reproducing apparatus of the present invention is provided with an above optical pickup head, a drive portion for changing the relative position between the information storage medium and the optical pickup head, and an electric signal processing portion for receiving signals output from the optical pickup head and performing calculations to obtain desired information.

BRIEF DESCRIPTION OF THE DRAWINGS

(FIG. 6A shows a case where the objective lens is off center, and FIG. 6B shows a case where the objective lens is in the center, and FIG. 6C shows a case where the objective lens is off-center in the opposite direction to that of FIG. 6A).

(FIG. 8A shows the optical detector on which the beams with an optical path bent by 90° are incident on, and FIG. 8B shows the optical detector on which the beams passing directly through are incident).

DESCRIPTION OF THE PREFERRED EMBODIMENTS

Hereinafter, embodiments of the present invention are described with reference to the accompanying drawings. It should be noted that in each of the drawings identical numerals represent identical structural elements or elements that have the same action or operation.

First Embodiment

Figure 1:
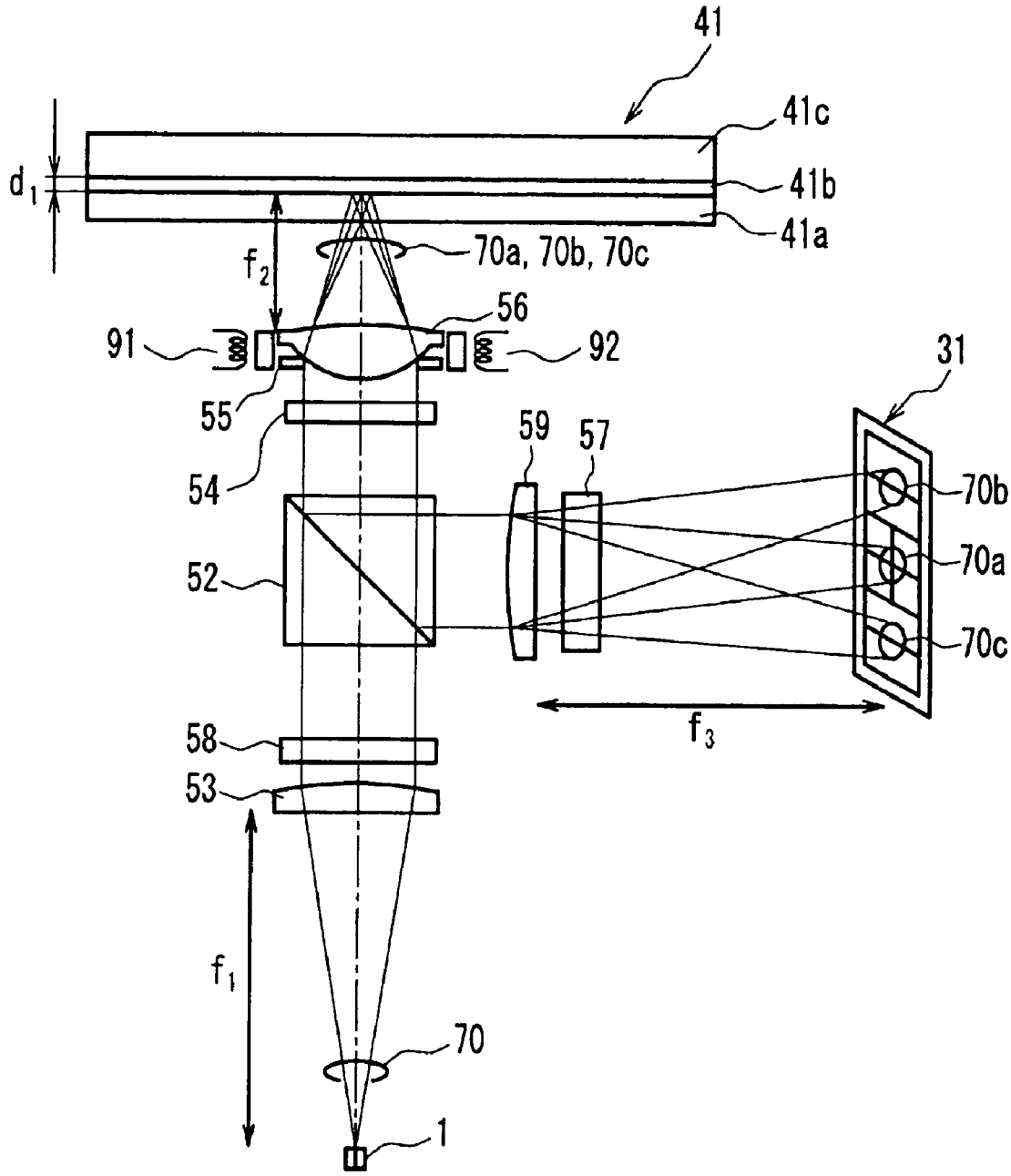
FIG. 1 shows the configuration of the optical pickup head according to the first embodiment of the present invention.

FIG. 1 shows the configuration of an optical pickup head according to the first embodiment of the present invention.

A semiconductor laser light source 1, serving as the light source, emits a linearly polarized divergent beam 70 with a wavelength $\lambda_1$ of 405 nm. After being converted into parallel light by a collimating lens 53 with a focal length $f_1$ of 15 mm, the divergent beam 70 emitted from the semiconductor laser light source 1 is incident on a diffraction grating 58 and split into three beams of zero order, −1st order and +1st order diffracted light. The zero order diffracted beam is a main beam 70a for recording/reproducing information, and the +1st and −1st order diffracted beams are sub-beams 70b and 70c used in DPP for stably detecting TE signals. The ratio of the diffraction efficiency of the zero order diffracted beam to either one of the 1st order diffracted beams is ordinarily set from 12:1 to 20:1, and here it is 20:1. Consequently, the sub-beams 70b and 70c are prevented from affecting the main beam 70a and unintentional recording can be avoided.

The three beams created by the diffraction grating 58, that is, the main beam 70a and the sub-beams 70b and 70c, pass through a polarizing beam splitter 52 and a quarter wavelength plate 54 and are converted into circularly polarized light, after which they are converted into a convergent beam by an objective lens 56 with a focal length $f_2$ of 2.1 mm and focused onto an optical storage medium 41.

The opening of the objective lens 56 is restricted by an aperture 55, and its numerical aperture NA is 0.85. The optical storage medium 41 has a transparent substrate 41a and two information recording planes. These are a first recording layer 41b and a second recording layer 41c. The spacing $\alpha_1$ between the first recording layer 41b and the second recording layer 41c is 20 μm, the thickness of the transparent substrate 41a is 0.1 mm, and the refractive index n of the intermediate layers positioned between the transparent substrate 41a and the first recording layer 41b and between the first recording layer 41b and the second recording layer 41c in both cases is 1.6. The convergent beam focused onto the optical storage medium 41 more specifically passes through the transparent substrate 41a and is focused on the first recording layer 41b.

Figure 2:
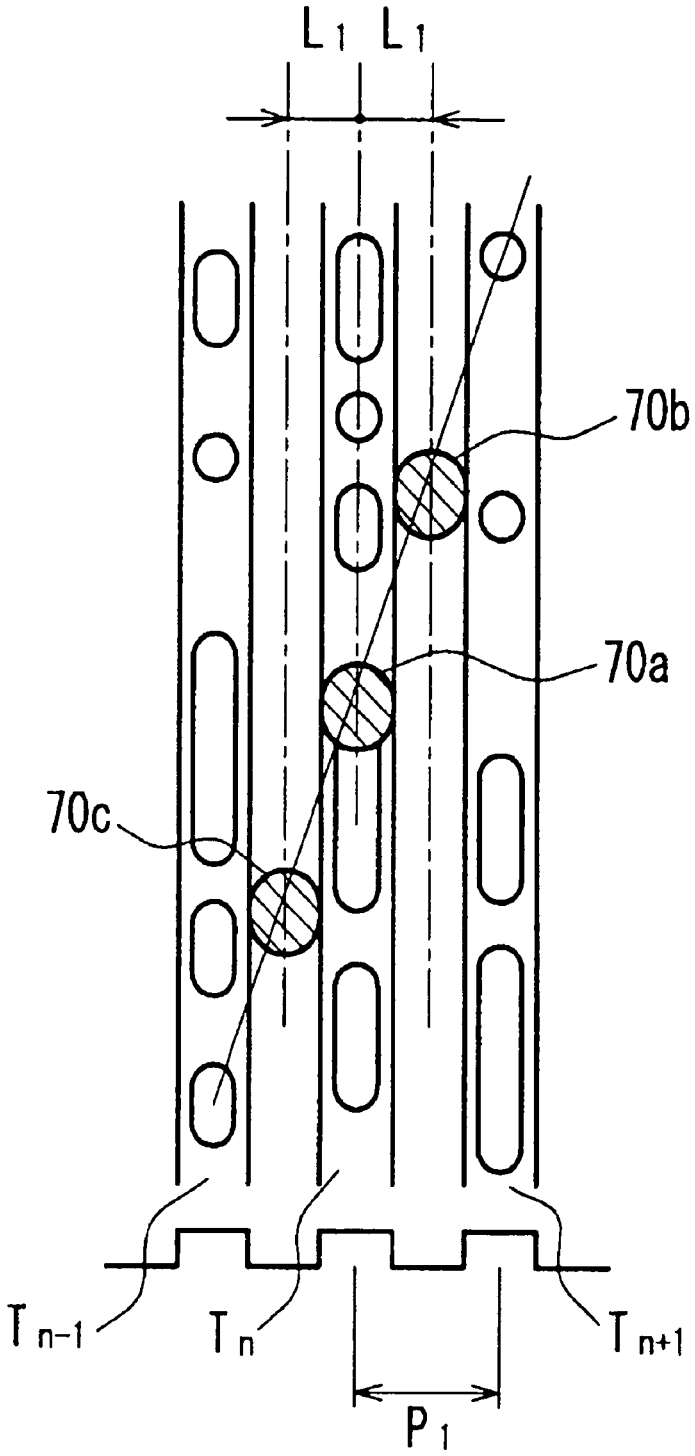
FIG. 2 shows the relationship between the tracks and the beam on the optical storage medium in the optical pickup head of the present invention.

FIG. 2 shows the relationship between the tracks and the beams on the first recording layer 41b of the optical storage medium 41. The first recording layer 41b and the second recording layer 41c each have tracks made from continuous grooves, and information is recorded in those grooves. A plurality of tracks are established in a periodic manner with a track pitch $p_1$, that is, the spacing between the track $T_n$ and the track $T_{n-1}$ and between the track $T_n$ and the track $T_{n+1}$, of 0.32 μm. The beams are arranged such that when the main beam 70a is positioned over the track $T_n$, the sub-beams 70b and 70c are positioned between the tracks $T_n$ and $T_{n-1}$ and the tracks $T_n$ and $T_{n+1}$, respectively. There is consequently a spacing L of 0.16 μm between the main beam 70a and the sub-beams 70b and 70c in the direction perpendicular to the track $T_n$.

The main beam 70a and the sub-beams 70b and 70c reflected by the first recording layer 41b pass through the objective lens 56 and the quarter wavelength plate 54 and are converted into linearly polarized light with a polarization that is rotated by 90° with respect to that of the incident path, after which they are reflected by the polarizing beam splitter 52. The main beam 70a and the sub-beams 70b and 70c reflected by the polarizing beam splitter 52 are incident on an optical detector 31 after passing through a detector lens 59 with a focal length $f_3$ of 30 mm and a cylindrical lens 57. Astigmatism is imparted on the main beam 70a and the sub-beams 70b and 70c when they pass through the cylindrical lens 57.

Figure 3:
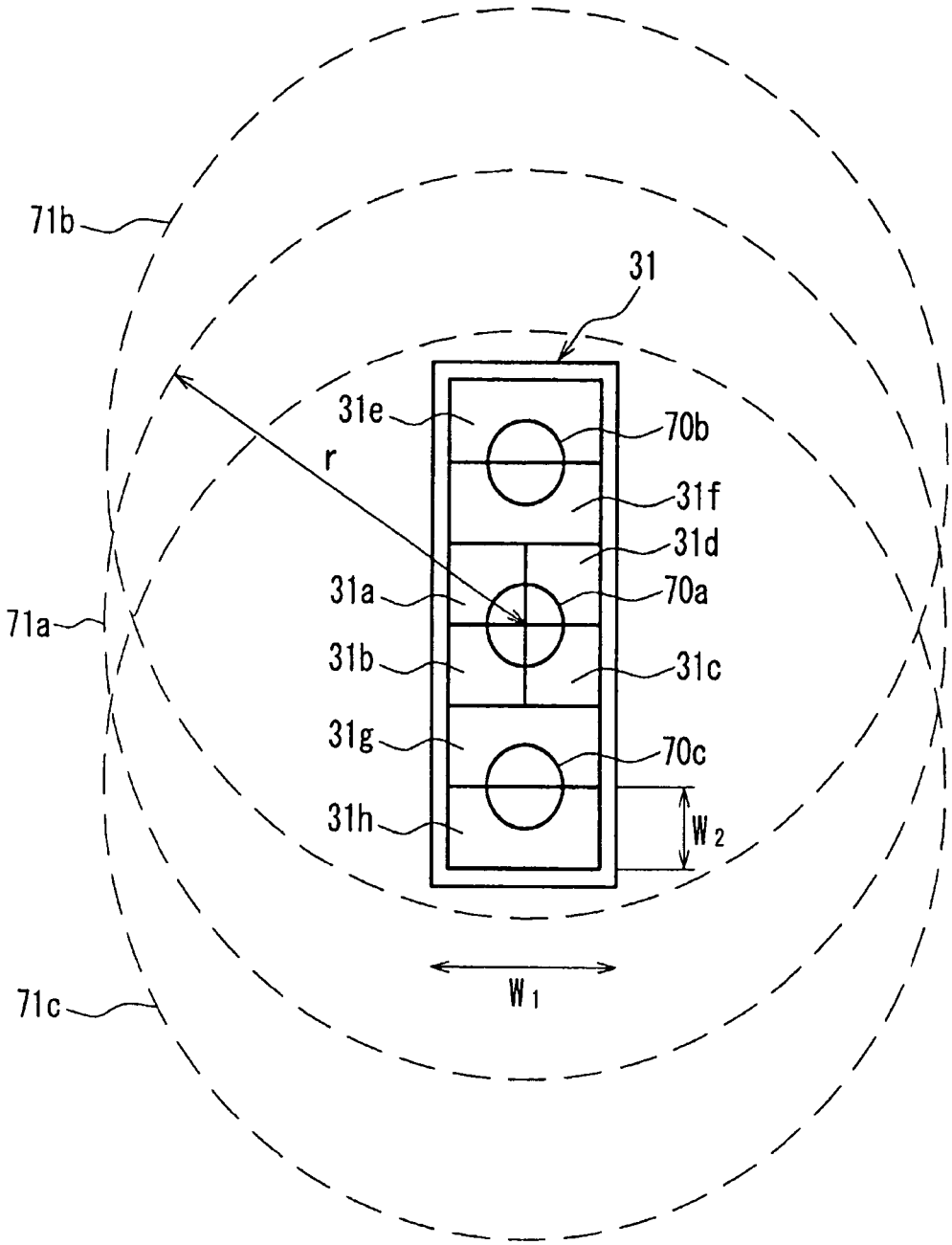
FIG. 3 shows the relationship between the optical detector and the beam in the optical pickup head according to the first embodiment of the present invention.

FIG. 3 shows the relationship between the optical detector 31, the main beam 70a, and the sub-beams 70b and 70c. The optical detector 31 has eight light receiving portions 31a, 31b, 31c, 31d, 31e, 31f, 31g, and 31h, and the light receiving portions 31a, 31b, 31c, 31d, 31e, 31f, 31g, and 31h output the current signals $I_{31a}$, $I_{31b}$, $I_{31c}$, $I_{31d}$, $I_{31e}$, $I_{31f}$, $I_{31g}$, and $I_{31h}$ corresponding to the received amount of light.

The light receiving portions 31a, 31b, 31c, and 31d receive the main beam 70a, the light receiving portions 31e and 31f receive the sub-beam 70b, and the light receiving portions 31g and 31h receive the sub-beam 70c. Each of the light receiving portions 31a, 31b, 31c, and 31d is 60 μm×60 μm. Each of the light receiving portions 31e, 31f, 31g, and 31h has a horizontal width $W_1$ of 120 μm and a vertical width $W_2$ of 60 μm. This means that the total size of the light receiving portion for receiving the main beam 70a and that for receiving each of the sub-beams 70b and 70c is 120 μm×120 μm each.

The main beam 70a and the sub-beams 70b and 70c are each beams reflected by the first recording layer 41b of the optical storage medium and imparted with astigmatism by the cylindrical lens 57, and their circle of least confusion on the optical detector 31 has a diameter of 60 μm. Consequently, the combined focal lengths forming the focal line of the combination of the detector lens 59 and the cylindrical lens 57 are 30 mm and 29.05 mm. It should be noted that the reason there are two focal lengths is that astigmatism is imparted on the beam.

Also, when recording and reproducing information with respect to the first recording layer 41b (focus plane) of the optical storage medium 41, a portion of the beam focused onto the first recording layer 41b is reflected and a portion passes through the first recording layer 41b and arrives at the second recording layer 41c (non-focus plane) as an unfocused beam and is reflected by the second recording layer 41c. Beams 71a, 71b, and 71c shown in FIG. 3 are the portions of the main beam 70a and the sub-beams 70b and 70c that are reflected by the second recording layer 41c (non-focus plane) and are significantly unfocused on the optical detector 31. The radius r of each of the beams 71a, 71b, and 71c on the optical detector 31 is approximately $r \approx 2 \cdot d \cdot NA \cdot \alpha$. Here, d is the optical spacing between reflective planes of the optical storage medium with $d=d_1/n$, and α is the lateral magnification of the optical system from the optical storage medium to the optical detector and is given by $\alpha=f_3/f_2$. In the first embodiment, $d_1$=20 μm, n=1.60, NA=0.85, $f_2$=2.1 mm, and $f_3$=30 mm, so r≈300 μm.

The beam 71a has a radius on the optical detector 31 of approximately 300 μm, and the light receiving portions 31e, 31f, 31g, and 31h of the optical detector 31 are positioned such that they are located within that radius. With this arrangement, even if the beam reflected by the non-focus plane moves on the optical detector 31 due to movement of the objective lens 56 during tracking, there is hardly any change in the amount of light of the beam 71a received at the light receiving portions 31e, 31f, 31g, and 31h, and as a result, offset does not occur in the TE signals.

Also, the FE signals are obtained by the astigmatism method using the signals $I_{31a}$, $I_{31b}$, $I_{31c}$, and $I_{31d}$ output from the optical detector 31, that is, by calculating $(I_{31a}+I_{31c})-(I_{31b}+I_{31d})$. The TE signals are obtained by DPP, that is, by calculating $\{(I_{31a}+I_{31d})-(I_{31b}+I_{31c})\}-K\cdot\{(I_{31e}+I_{31g})-(I_{31f}+I_{31h})\}$. Here, K is a coefficient determined by the ratio of the diffraction efficiency of the zero order diffracted light to either the +1st or −1st order diffracted light of the diffraction grating 58.

After amplification to a desired level and phase compensation, the FE signals and the TE signals are supplied to the actuators 91 and 92 for moving the objective lens 56 to carry out focus and tracking control.

Figure 4:
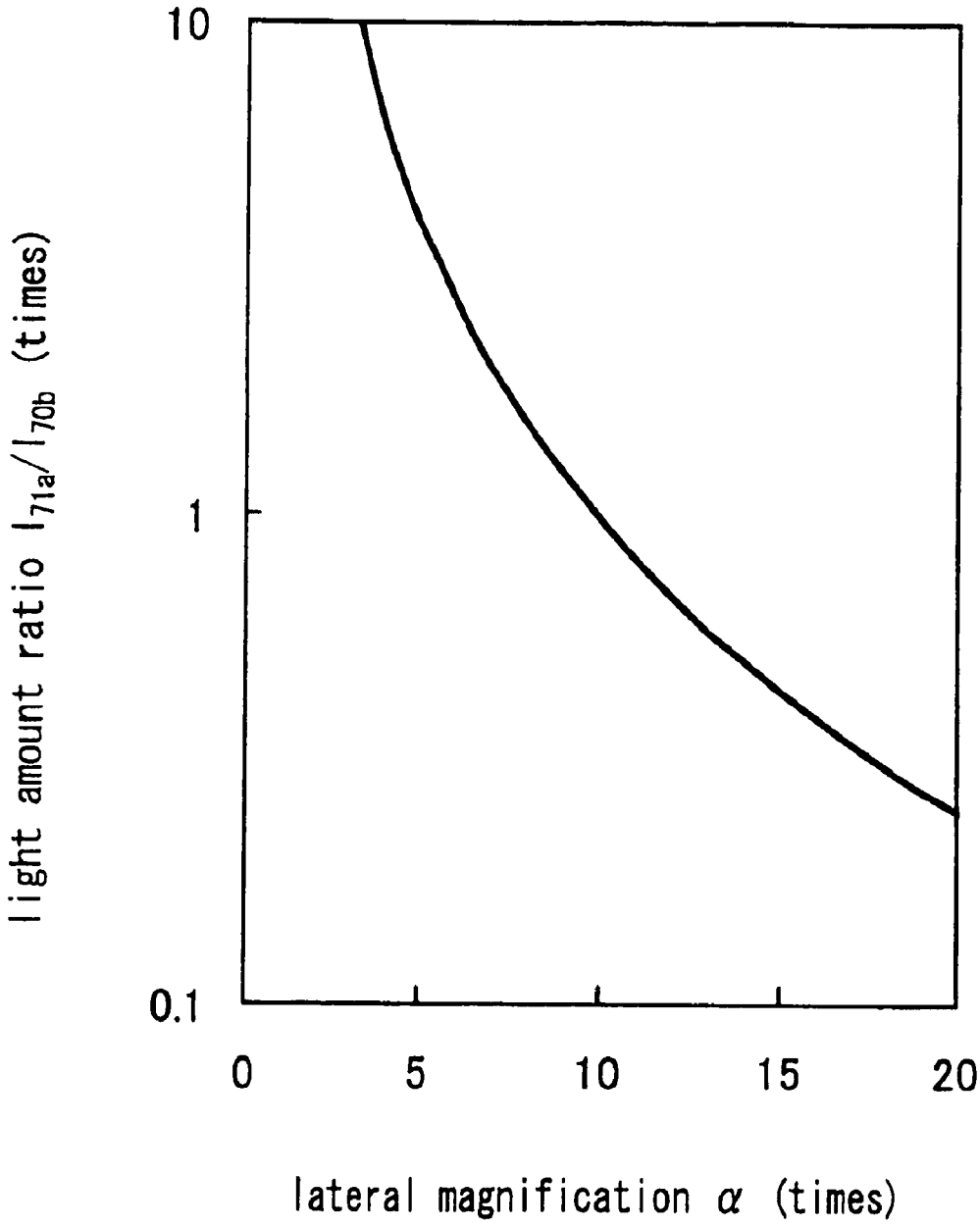
FIG. 4 shows the relationship between the lateral magnification and the light amount ratio in the optical pickup head according to the first embodiment of the present invention.

FIG. 4 shows the relationship under the optical conditions of the first embodiment between the light amount $I_{70b}$ of the sub-beam 70b incident on the light receiving portion 31e and the light receiving portion 31f and the light amount $I_{71a}$ of the beam 71a of the main beam 70a reflected by the second recording layer (non-focus plane) 41c (hereinafter, referred to as amount of stray light), in a case where the lateral magnification α of the optical system is changed by changing the focal length $f_3$ of the detector lens 59. It should be noted that this relationship is the same for the amount of stray light $I_{71a}$ and the light amount $I_{70c}$ of the light receiving portion 32g and the light receiving portion 32h on which the sub-beam 70c is incident.

Increasing α decreases the amount of stray light $I_{71a}$ and decreasing α increases the amount of stray light $I_{71a}$. A large value for the amount of stray light $I_{71a}$ results in offset variation in the TE signal, so it is preferable that the lateral magnification α is increased to reduce the amount of stray light $I_{71a}$. In practice, this means that if the amount of stray light $I_{71a}$ is equal to or less than the light amount $I_{70b}$ of the sub-beam 70b, then TE signals are hardly offset for example during tracking or when tilting occurs in the optical storage medium. As shown in FIG. 4, when the lateral magnification α is ten-fold, then the amount of stray light $I_{71a}$ and the light amount $I_{70b}$ are equal, and thus α is preferably set to ten-fold.

Offset ideally should not occur with DPP because the stray light component is cancelled by the differential calculation, but in actuality the amount of stray light may not be cancelled completely because of aberrations and variations of the amount of light within the beam. Considering actual aberration and light amount variations, if the amount of stray light $I_{71a}$ is equal to or less than the light amount $I_{70b}$ of the sub-beam 70b, then the amount of residual offset is not more than several percent of the amount of light entering the light receiving portions, and the amount of off-track resulting from this offset is small enough that it may be ignored.

When the amount of stray light $I_{71a}$ and the sub-beam light amount $I_{70b}$ are equal, then the area $S_1$ of the light receiving portions 31e and 31f receiving the sub-beam 70b is approximately equal to $4\cdot\pi\cdot(d\cdot NA\cdot\alpha)^2\cdot\eta_s/\eta_m$, and to make the amount of stray light $I_{71a}$ less than the light amount $I_{70b}$ of the sub-beam 70b, the total area $S_1$ of the light receiving portions 31e and 31f (or the light receiving portions 31g and 31h) for receiving a single sub-beam 70b (or 70c) should be made less than $4\cdot\pi\cdot(d\cdot NA\cdot\alpha)^2\cdot\eta_s/\eta_m$. Here, $\eta_m$ is the diffraction efficiency of the main beam 70a split by the diffraction grating 58 and $\eta_s$ is the diffraction efficiency of the sub-beam 70b split by the diffraction grating 58. Consequently, an information recording/reproducing apparatus using the optical pickup head of the first embodiment faithfully can read out the information stored on the optical storage medium without erasing information stored on adjacent tracks, even if the medium is a recordable two-layered disk.

It should be noted that if the effective reflectance $R_{fo}$ of the first recording layer 41b, which is the plane where the beams 70a, 70b, and 70c are focused, and the effective reflectance $R_{dfo}$ of the second recording layer 41c, where the beams 70a, 70b, and 70c are unfocused and reflected, are different, the same effect can be attained if the area $S_1$ of the light receiving portions 32e and 32f is set to less than $4\cdot\pi\cdot(d\cdot NA\cdot\alpha)^2\cdot\eta_s/\eta_m\cdot R_{fo}/R_{dfo}$. Here, when the reflectance of the first recording layer 41b is $R_{41b}$, the transmissivity is $T_{41b}$, and the reflectance of the second recording layer 41c is $R_{41c}$, then the effective reflectance $R_{fo}$ of the first recording layer 41b is $R_{41b}$ and the effective reflectance $R_{dfo}$ of the second recording layer 41c is $T_{41b}\cdot T_{41b}\cdot R_{41c}$.

Also, configuring the detector lens 59 by combining a convex lens and a concave lens makes it possible to keep the optically equivalent focal length long while shortening the physical length. Consequently, the optical pickup head is not increased in size even if the focal length $f_3$ is long, thus making it possible to obtain a small optical pickup head with little offset.

The first recording layer 41b and the second recording layer 41c were described as the focus plane and the non-focus plane, respectively, but the same effect as above also can be achieved when recording/reproducing information with respect to the second recording layer 41c simply by letting the second recording layer 41c be the focus plane and the first recording layer 41b be the non-focus plane.

If the optical storage medium 41 is of a type where information only can be recorded either on or between grooves, then when recording or erasing information, the main beam is positioned over the track and the two sub-beams are positioned between tracks but not on them, so that the information stored on the tracks is not easily erased. Therefore, there is absolutely no problem with making the ratio of the diffraction efficiency 10:1 in this case. When the area $S_1$ of the light receiving portion for receiving either the beam 70b or the beam 70c is less than $4\cdot\pi\cdot(d\cdot NA\cdot\alpha)^2\cdot\eta_s/\eta_m$, then the lateral magnification $\alpha$ of the optical system can be reduced for the amount that the amount of light of the sub-beam 70b or 70c is increased. Since the lateral magnification $\alpha$ can be reduced if the focal length $f_2$ of the objective lens 56 is constant, the focal length $f_3$ of the detector lens 59 can be reduced and accordingly the size of the optical pickup head can be reduced and a small information recording/reproducing apparatus can be provided. Also, in a case where the lateral magnification $\alpha$ of the optical system is the same, the effects of stray light are reduced accordingly with an increase in the amount of light of the sub-beam 70b or 70c, and consequently the optical pickup head is capable of more stable tracking control.

Various modifications of the optical pickup head of the present invention are possible without departing from the gist thereof, for example changing the method for focus detection from the astigmatism method to spot size detection or using a beam-shaping prism to increase the efficiency of light utilization. Furthermore, there are no limitations to the wavelength of the light source or the NA of the objective lens, and these can be adopted appropriately to suit various optical conditions.

Second Embodiment

The optical pickup head according to the second embodiment of the present invention is provided with a semiconductor laser light source of a configuration and arrangement different from that of the optical pickup head of the first embodiment. The rest of the configuration is the same as that of the optical pickup head of the first embodiment.

In the second embodiment, a semiconductor laser that emits a beam with a wavelength less than 450 nm is used for the light source. In this case it is preferable that the substrate constituting the light source and the tracks on the optical storage medium are arranged optically parallel.

Since materials such as gallium nitride or zinc selenide used for configuring lasers that emit a laser beam with a wavelength less than 450 nm have numerous lattice defects, and because of auto-compensation effects, the confinement of current and light within the active layer is weakened and spontaneously emitted light tends to be emitted from spots other than the emission point. There is a risk that this spontaneously emitted light will cause offset fluctuations due to tracking.

Figure 5:
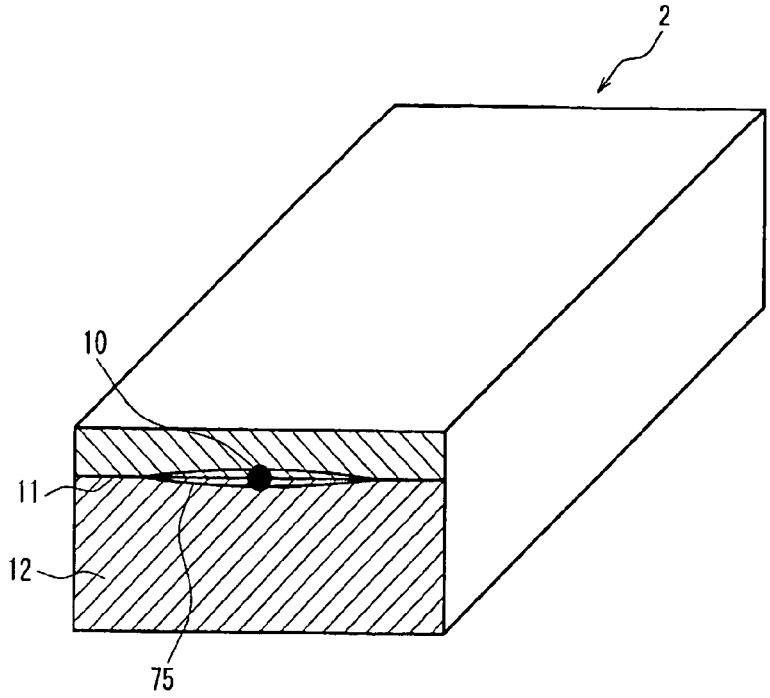
FIG. 5 is a perspective view showing the configuration of the light source in the optical pickup head according to the second embodiment of the present invention.

FIG. 5 is a perspective view of the configuration of the semiconductor laser light source according to the second embodiment. A laser beam is emitted from an emission point 10 of a semiconductor laser light source 2. As shown in FIG. 5, however, in addition to the laser beam, a beam 75 of amplified spontaneously emitted light is emitted from an active layer 11 made of gallium nitride. After being focused on and reflected by an information recording plane of the optical storage medium 41, this beam 75, too, is incident on the optical detector 31. Also, although not shown in the drawings, the semiconductor laser light source 2 is disposed such that the substrate 12 is optically parallel to the tracks of the optical storage medium.

Figures 6A, 6B, 6C:
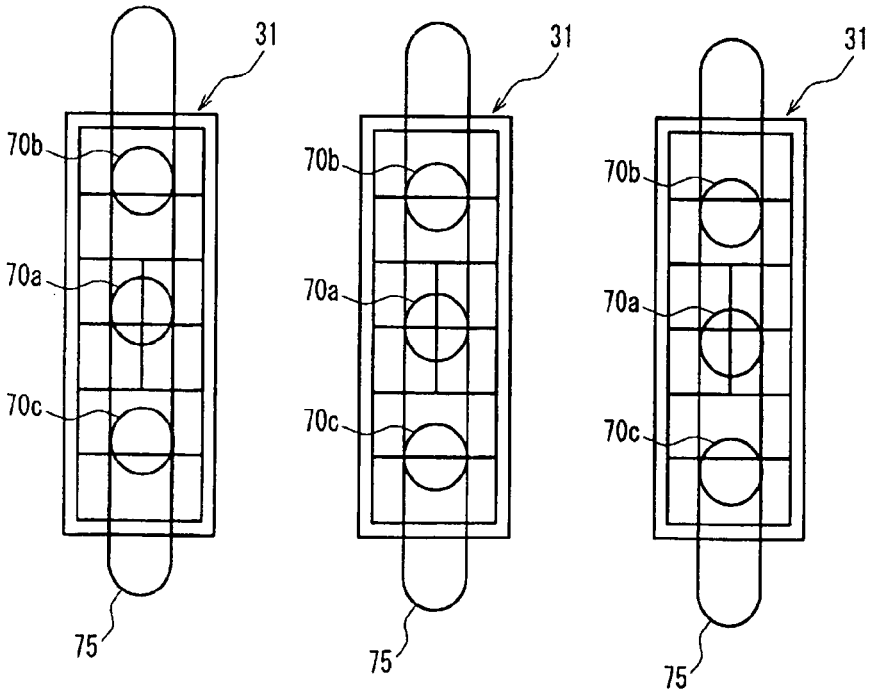
FIGS. 6A to 6C show the relationship between the optical detector and the beams in the optical pickup head according to the second embodiment of the present invention

FIGS. 6A, 6B and 6C illustrate the relationship between the optical detector 31, the main beam 70a, the sub-beams 70b and 70c, and the beam 75 according to the second embodiment. FIG. 6B is a case where the objective lens 56 is centered, and FIGS. 6A and 6C are cases where the objective lens 56 is off-center. The direction in which the objective lens 56 moves is opposite in FIGS. 6A and 6C.

The beam 75 of spontaneously emitted light that is reflected by an information recording plane of the optical storage medium 41 is incident on the optical detector 31 as well, but since the substrate 12 constituting the light source is arranged optically parallel to the tracks on the optical storage medium 41, the beam 75 is so as to incident spreading widely in the direction in which the light receiving portions 31a, 31b, 31c, 31d, 31e, 31f, 31g, and 31h are lined up, as shown in FIGS. 6A, 6B and 6C. Even when the position of the objective lens 56 is moved for tracking and in response the position of the main beam 70a, the sub-beams 70b and 70c, and the beam 75 moves with respect to the optical detector 31, there is hardly any change in the amount of light of the beam 75 that is incident on the light receiving portions 31a, 31b, 31c, 31d, 31e, 31f, 31g, and 31h of the optical detector 31. Thus, a tracking operation that is stable and without offset fluctuation is possible.

In the second embodiment, a configuration for the optical pickup head was shown in which three beams, that is, the main beam 70a and the sub-beams 70b and 70c, are used to detect TE signals, but the same effects can be obtained by a apparatus with the same configuration that uses a single beam to detect the TE signals by push-pull method. Also, the same effects can be achieved even if the optical storage medium has only a single information recording plane.

It should be noted that here sapphire was used for the substrate 12 and gallium nitride was used for the active layer of the semiconductor laser light source 2, but the same effects can be achieved in a case where gallium nitride is used for the substrate 12 and gallium nitride to which indium has been added is used for the active layer, for example, even if a semiconductor laser of gallium nitride, which tends to generate spontaneously emitted light, or a semiconductor laser light source 2 of a II-VI compound semiconductor such as zinc selenide is used.

If the substrate 12 of the semiconductor laser light source 2 is arranged optically parallel to the tracks of the optical storage medium, then the effects mentioned above can be similarly achieved, and there are no restrictions to the optical structure of the optical pickup head.

Third Embodiment

Figure 7:
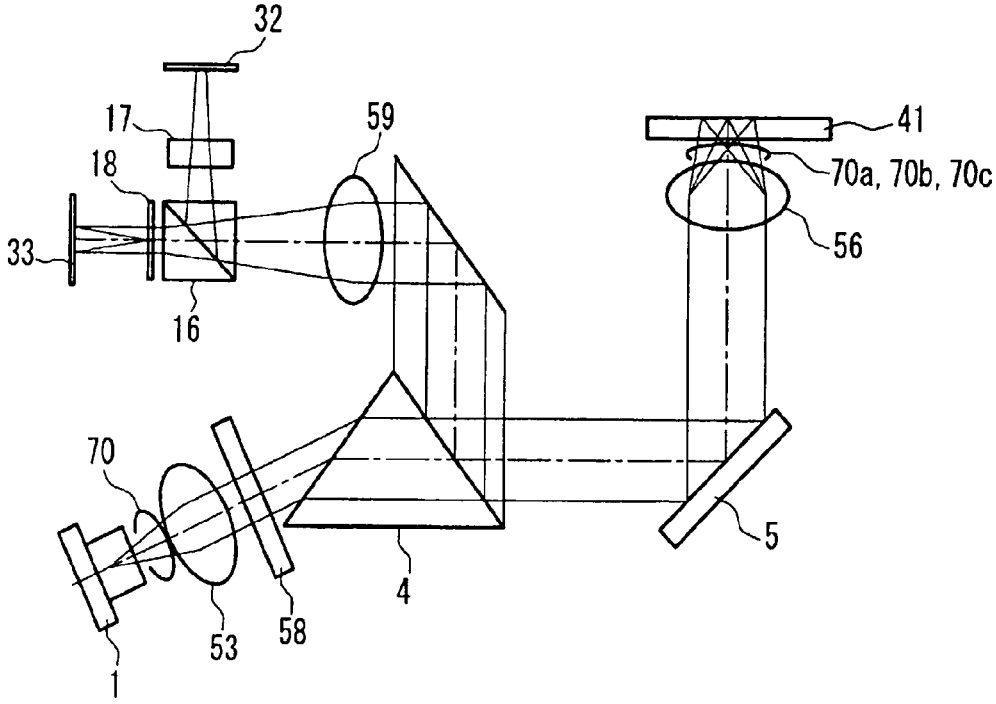
FIG. 7 shows the configuration of the optical head according to the third embodiment of the present invention.

The configuration of the optical pickup head according to a third embodiment of the present invention will be described using FIG. 7.

A beam 70 with a 405 nm wavelength emitted from the semiconductor laser light source 1 passes through the collimating lens 53, the diffraction grating 58, a compound beam-shaping prism 4, and a mirror 5 that reflects incident beams in an upward direction, and is then focused onto the optical storage medium 41 by the objective lens 56. The main beam 70a for recording/reproducing and the sub-beams 70b and 70c are focused onto the optical storage medium 41. The main beam 70a and the sub-beams 70b and 70c reflected by the optical storage medium 41 have their light path changed by the compound beam-shaping prism 4 and are incident on a beam splitter 16 after further passing through the detector lens 59.

The beam splitter 16 splits the incident main beam 70a and sub-beams 70b and 70c into two beams. The path of one of the beams split by the beam splitter 16 is turned approximately 90°, then as in a conventional optical pickup head, is imparted with astigmatism by passing through the cylindrical lens 17 and is incident on an optical detector 32. The other of the beams split by the beam splitter 16 passes directly through the beam splitter 16 and a beam that is parallel to the direction of the tracks on the optical storage medium 41 is separated by a holographic element 18 having two blazed regions for creating push-pull signals, and is incident on an optical detector 33.

Figure 9:
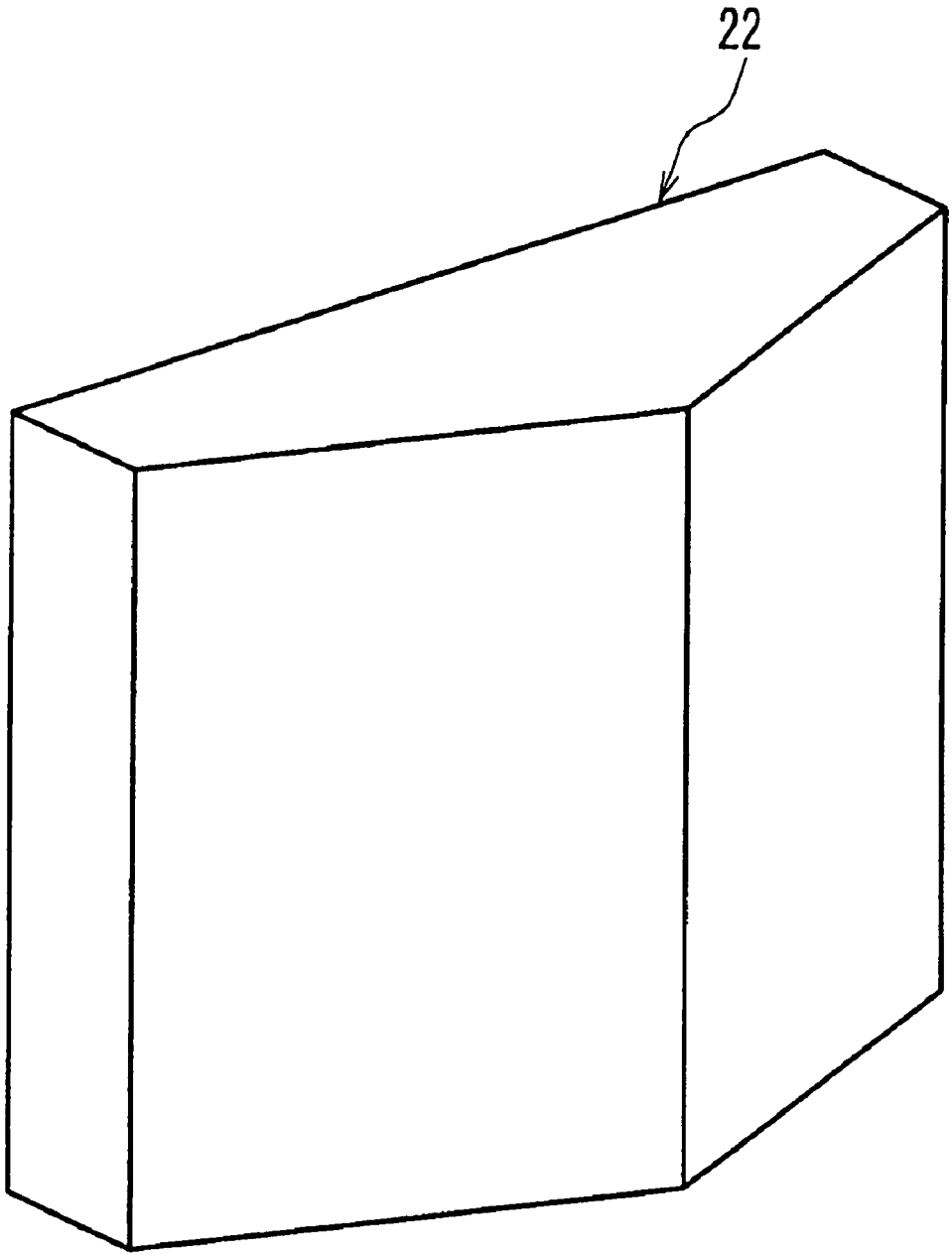
FIG. 9 is a perspective view showing the structure of the prism in the optical pickup head according to the third embodiment of the present invention.

It should be noted that in place of the holographic element 18, a roof prism 22 configured as shown in FIG. 9 also can be used as the element for splitting the beam for creating push-pull signals into two beams. With this configuration, DPP signals can be obtained.

Figure 8A:
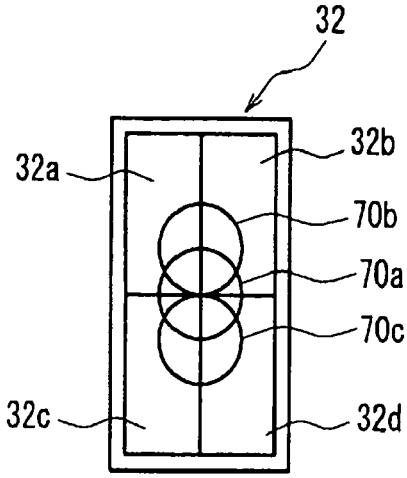
FIGS. 8A and 8B show the relationship between the optical detector and the beams in the optical pickup head according to the third embodiment of the present invention

FIG. 8A illustrates the relationship between the beams and the optical detector 32 on which beams are incident whose optical path has been bent by 90°. The optical detector 32 for detecting FE signals has four light receiving portions 32a, 32b, 32c, and 32d and outputs output signals $F_1$, $F_2$, $F_3$, and $F_4$ corresponding to the amount of light that is incident. Based on the output signals $F_1$, $F_2$, $F_3$, and $F_4$, FE signals can be obtained by the astigmatism method. More specifically, FE signals are obtained by calculating Equation 1.

$$\text{FE signal}=(F_1+F_3)-(F_2+F_4) \quad \text{(Equation 1)}$$

Figure 8B:
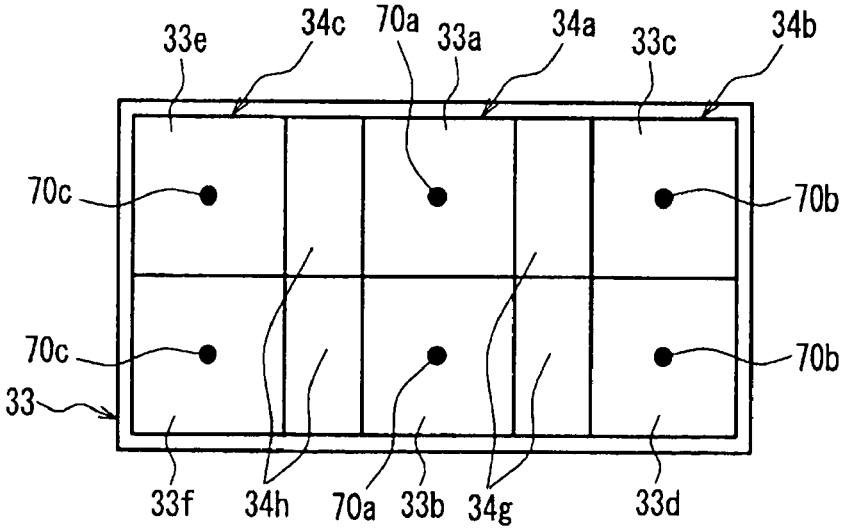

FIG. 8B shows the relationship between the beams and the optical detector 33 on which the beams passing directly through the beam splitter are incident. The optical detector 33 for detecting the TE signals has six light receiving portions 33a, 33b, 33c, 33d, 33e, and 33f. The light receiving portions 33a and 33b together form a main beam light receiving portion 34a for receiving the main beam 70a, the light receiving portions 33c and 33d together form a sub-beam light receiving portion 34b for receiving the sub-beam 70b, and the light receiving portions 33e and 33f together form a sub-beam light receiving portion 34c for receiving the sub-beam 70c.

Between the main beam light receiving portion 34a and the sub-beam light receiving portion 34b is placed a dummy light receiving portion 34g, and between the main beam light receiving portion 34a and the sub-beam light receiving portion 34c is placed a dummy light receiving portion 34h.

Generated current is generally leaked between the light receiving portions of optical detectors, causing cross-talk between the light receiving portions. Particularly in the case of tracking formats using DPP, cross-talk from the light receiving portions for receiving the main beam, which has a large optical intensity, to the light receiving portions for receiving the sub-beams, which have a small optical intensity, cannot be ignored. Because dummy light receiving portions 34g and 34h are provided, however, current leaked from the main beam light receiving portion 34a flows into the dummy light receiving portions 34g and 34h and does not mix into the sub-beam light receiving portions 34b and 34c. Although not shown in the drawings, the dummy light receiving portions 34g and 34h are connected to a suitable potential so that current mixed into the dummy light receiving portions 34g and 34h from the main beam light receiving portion 34a does not then flow into the sub-beam light receiving portions 34b and 34c. Consequently, there is a reduction in cross-talk between the main beam light receiving portion 34a and the sub-beam light receiving portions 34b and 34c, and high optical and electrical isolation between the main beam 70a and the sub-beam 70b or 70c can be maintained in the optical detector 33.

The light receiving portions 33a, 33b, 33c, 33d, 33e, and 33f put out output signals $T_1$, $T_2$, $T_3$, $T_4$, $T_5$, and $T_6$ corresponding to the amount of incident light. Based on these output signals, TE signals can be obtained by DPP. More specifically, TE signals are obtained by calculating Equation 2 (wherein k is a constant).

$$\text{TE signal}=(T_1-T_2)-k\{(T_3-T_4)+(T_5-T_6)\} \quad \text{(Equation 2)}$$

TE signals, however, change in signal amplitude due to changes in the reflectance, for example, of the optical storage medium. Accordingly, an automatic gain control (hereinafter, referred to as AGC) circuit for dividing the TE signals by the total signal light amount ordinarily is provided to keep tracking control gain constant even if the reflectance of the optical storage medium changes in practice. That is, it is preferable that TE signals are obtained by dividing the push-pull signal obtained from the main beam 70a by the total of the signals $T_1$ and $T_2$ output from the light receiving portions 33a and 33b for receiving the main beam 70a and dividing the push-pull signal obtained from the sub-beams 70b and 70c by the total of the signals $T_3$, $T_4$, $T_5$, and $T_6$ output from the light receiving portions 33c, 33d, 33e, and 33f for receiving the sub-beams.

More specifically, it is preferable that TE signals are obtained by calculating as shown in Equation 3.

$$\text{TE signal}=(T_1-T_2)/(T_1+T_2)-k[\{(T_3-T_4)+(T_5-T_6)\}/(T_3+T_4+T_5+T_6)] \quad \text{(Equation 3)}$$

When recording and reproducing two-layered recording disks, however, the sum signal of the signals $T_3$, $T_4$, $T_5$, and $T_6$ output from the light receiving portions 33c, 33d, 33e, and 33f for receiving the sub-beams 70b and 70c includes too much stray light, due to the portion of the main beam 70a reflected by the non-focus plane, with respect to the amount of light of the sub-beams 70b and 70c reflected by the recording/reproducing layer (focus plane), thus causing an unstable operation different from the originally intended AGC operation and as a result negatively affecting the AGC operation of TE signals by DPP. To prevent this, in a case where two-layered recording disks are used, AGC is performed for both the push-pull signal obtained from the main beam and the push-pull signal obtained from the sub-beams using the total of the signals output from the light receiving portions for receiving the main beam, and thus the AGC operation can be kept from becoming unstable. More specifically, it is preferable that TE signals are obtained through the calculation shown in Equation 4.

$$\text{TE signal}=(T_1-T_2)/(T_1+T_2)-k[\{(T_3-T_4)+(T_5-T_6)\}/(T_1+T_2)] \quad \text{(Equation 4)}$$

In addition to detecting TE signals by DPP as illustrated above, TE signals also may be detected by adopting a simple push-pull method using only output signals corresponding to the amount of light in the main beam 70a, in which case division is performed using the total of the signals $T_1$ and $T_2$, as was the case with detection by DPP. Consequently, servo gain can be kept constant even if there are changes in the reflectance of the information recording plane of the optical storage medium. More specifically, TE signals are obtained through the calculation shown in Equation 5.

$$\text{TE signal}=(T_1-T_2)/(T_1+T_2) \quad \text{(Equation 5)}$$

Here, when $T_{f1}$ and $T_{f2}$ are the signals output by the beam reflected by the focus plane being incident on the light receiving portions 33a and 33b and $T_{s1}$ and $T_{s2}$ are the signals output by the beam reflected by the non-focus plane being incident on the light receiving portions 33a and 33b, then Equation 5 becomes TE signal$=(T_{f1}+T_{s1}-T_{f2}-T_{s2})/(T_{f1}+T_{s1}+T_{f2}+T_{s2})$. As can be seen from this calculation, the more the beam reflected by the non-focus plane is incident on the light receiving portions 33a and 33b, the smaller the gain of the tracking control. Accordingly, if $T_{f1}+T_{f2}\geqq 5\cdot(T_{s1}+T_{s2})$ is satisfied, then the change in tracking control gain is 20% or less, and stable tracking control without practical problems are possible.

Also, the amount of the main beam 70a is greater than the amount of the sub-beams 70b and 70c, so that the impact of stray light is less with a simple push-pull method than with DPP, and accordingly the lateral magnification $\alpha$ of the optical system can be reduced. Moreover, by using a simple push-pull method, the optical pickup head can be made even smaller.

It is also possible to obtain information signals RF recorded on the optical storage medium 41 through the following calculation by using the signals $T_1$ and $T_2$ output from the light receiving portions 33a and 33b.

$$RF=T_1+T_2$$

Also, using the signals $F_1$, $F_2$, $F_3$, and $F_4$ output from the light receiving portions 32a, 32b, 32c, and 32d of the above-mentioned optical detector 32 for detecting FE signals, TE signals also can be obtained by a so-called phase difference method through the calculation of Equation 6.

$$\text{TE signal}=(F_1+F_3)\langle\text{phase comparison}\rangle(F_2+F_4) \quad \text{(Equation 6)}$$

In the <phase comparison> in Equation 6, the phase difference of the sum signal $A_1$ of the signals $F_1$ and $F_3$ and the sum signal $A_2$ of the signals $F_2$ and $F_4$ is calculated to obtain a signal corresponding to the polarity of the phase difference (whether the signal $A_1$ is ahead or behind the signal $A_2$) and the absolute value of the amount of phase difference.

Thus, the optical pickup head of the third embodiment has a configuration capable of obtaining TE signals by DPP to perform tracking control in the case of an optical storage medium for recording and reproducing in which continuous grooves are formed, and of obtaining TE signals by the phase difference method to perform tracking control in the case of a read-only optical storage medium in which a line of pits is formed.

Further, the distance between the light of the main beam 70a and the sub-beam 70b or 70c on the information recording plane of the optical storage medium 41 is set to 4 μm, so that there is hardly any drop in tracking gain even if the optical storage medium 41 has a narrow track pitch of 0.32 μm or there is eccentricity of several dozen μm in the optical storage medium 41. For this reason, the main beam 70a and the sub-beams 70b and 70c are incident in an overlapping state on the light receiving portions 32a, 32b, 32c, and 32d of the optical detector 32 for detecting FE signals. Thus, the greater the amount of light of the sub-beams 70b and 70c with respect to the main beam 70a, the more the amplitude of the TE signals obtained by phase difference drops. For example, when the ratio of the amount of light of the sub-beams 70b and 70c to the main beam 70a is 9:1, the amplitude of the TE signals drops approximately 10%, and a drop of this amount causes no problems at all.

Since the amount of light of the sub-beams 70b and 70c with respect to the main beam 70a ordinarily is set smaller than 1/9 so that the signals recorded on the optical storage medium are not erased, the TE signals can be obtained by the phase difference method without problems with the configuration of the optical pickup head of the third embodiment.

Of course, since the main beam 70a and the sub-beams 70b and 70c on the optical detector 34 for detecting TE signals by DPP are focused onto a spot with little aberration and an extremely small diameter, the main beam 70a can be separated easily from the sub-beam 70b or the sub-beam 70c.

Fourth Embodiment

An optical pickup head according to a fourth embodiment of the present invention will be described with reference the drawings.

Figure 10:
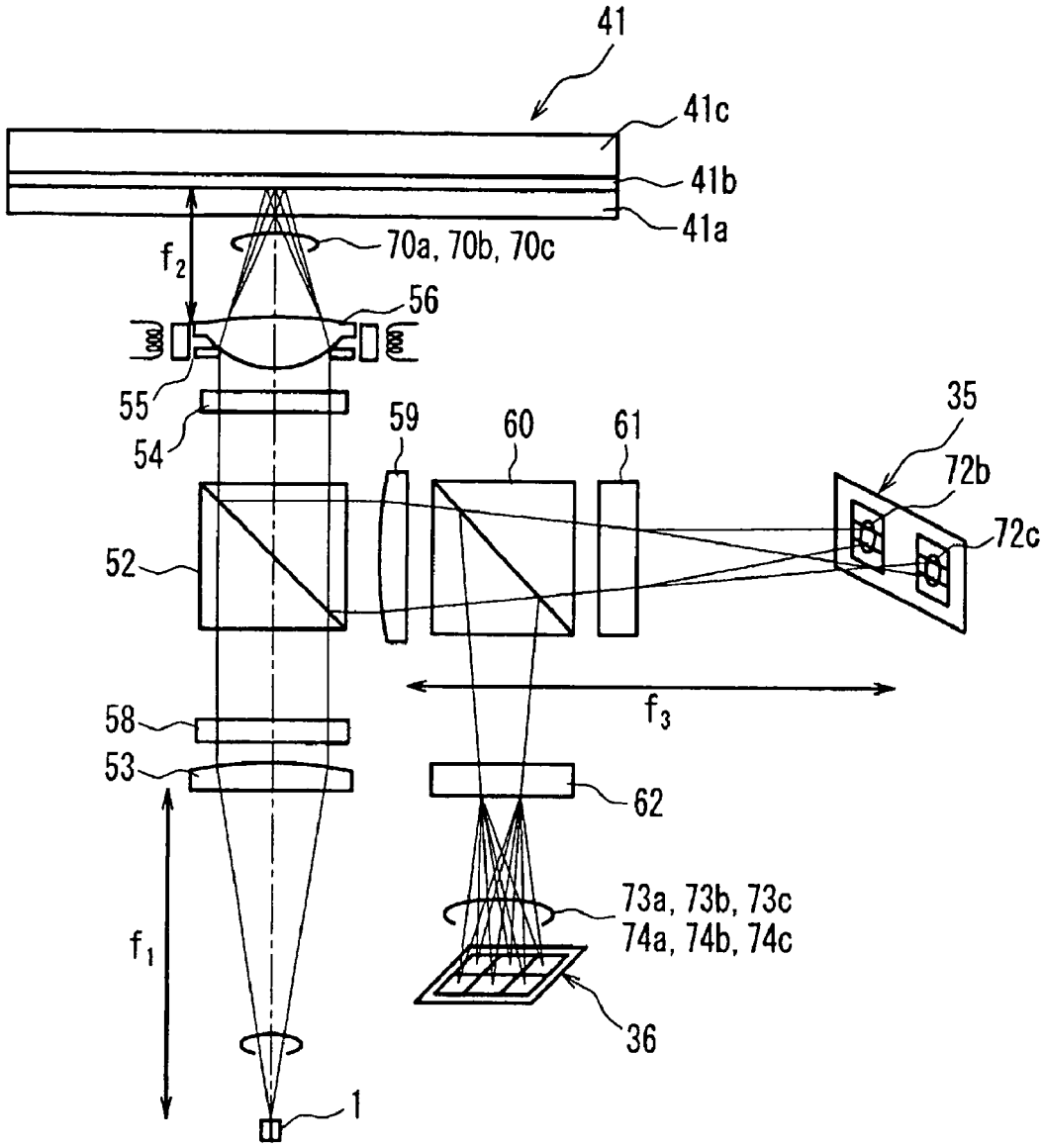
FIG. 10 shows the configuration of the optical pickup head according to the fourth embodiment of the present invention.

FIG. 10 shows the configuration of the optical pickup head according to the fourth embodiment of the present invention. This optical pickup head differs from that of the first embodiment with regard to the optical system through which the beam passes after being reflected at the polarizing beam splitter 52, and more specifically in that it is provided with a beam splitter 60, a holographic element 61, a diffraction grating 62, and optical detectors 35 and 36 in place of the optical detectors 32 and 33.

The main beam 70a and the sub-beams 70b and 70c reflected at the polarizing beam splitter 52 become convergent beams at the detector lens 59 of a focal length $f_3$ of 30 mm, and at the beam splitter 60 the incident light is split into two beams, with 10% of the incident light transmitted and the remaining 90% reflected.

The beam transmitted through the beam splitter 60 is incident on the holographic element 61, creating +1st and −1st order diffracted beams 72b and 72c. The +1st and −1st order diffracted beams 72b and 72c are received by the optical detector 35. An off-axis zone plate that enables the detection of FE signals by spot size detection is stored as a pattern in the holographic element 61.

Figure 11:
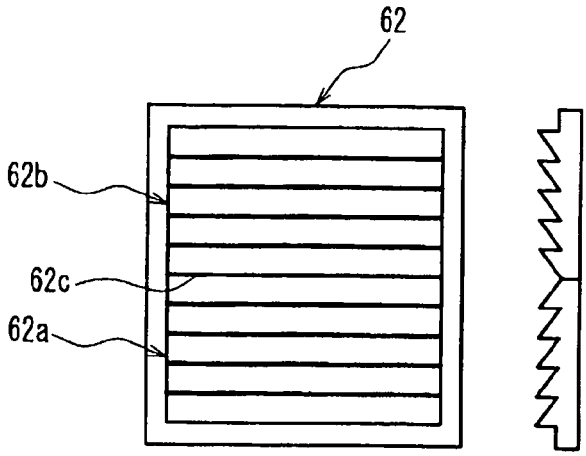
FIG. 11 is a structural diagram of the diffraction grating of the optical pickup head according to the fourth embodiment of the present invention.

On the other hand, the beam that is reflected by the beam splitter 60 is incident on the diffraction grating 62 and two +1st order diffracted beams are created. These are received by the optical detector 36. FIG. 11 shows the structure of the diffraction grating 62 according to the fourth embodiment. Two types of simple grating patterns 62a and 62b are formed in the diffraction grating 62, each with a sawtooth pattern and structured to suppress −1st order diffracted beams. The sawtooth pattern can be formed as a general blazed pattern by for example sloped ion beam etching or etching in which a plurality of masks are combined.

A boundary 62c between the pattern 62a and the pattern 62b has a parallel relationship to the image created on the tracks on the optical storage medium 41 by the main beam 70a and the sub-beams 70b and 70c. The patterns 62a and 62b have the same pitch but are different in the direction of their sawtooth profile. The pattern 62a creates diffracted beams 73a, 73b, and 73c and the pattern 62b creates diffracted beams 74a, 74b, and 74c. The diffracted beams 73a and 74a are created from the main beam 70a, the diffracted beams 73b and 74b are created from the sub-beam 70b, and the diffracted beams 73c and 74c are created from the sub-beam 70c. Also, diffracted beams 71d and 71e are created from the main beam 70a that is reflected by the non-focus plane.

Figure 12:
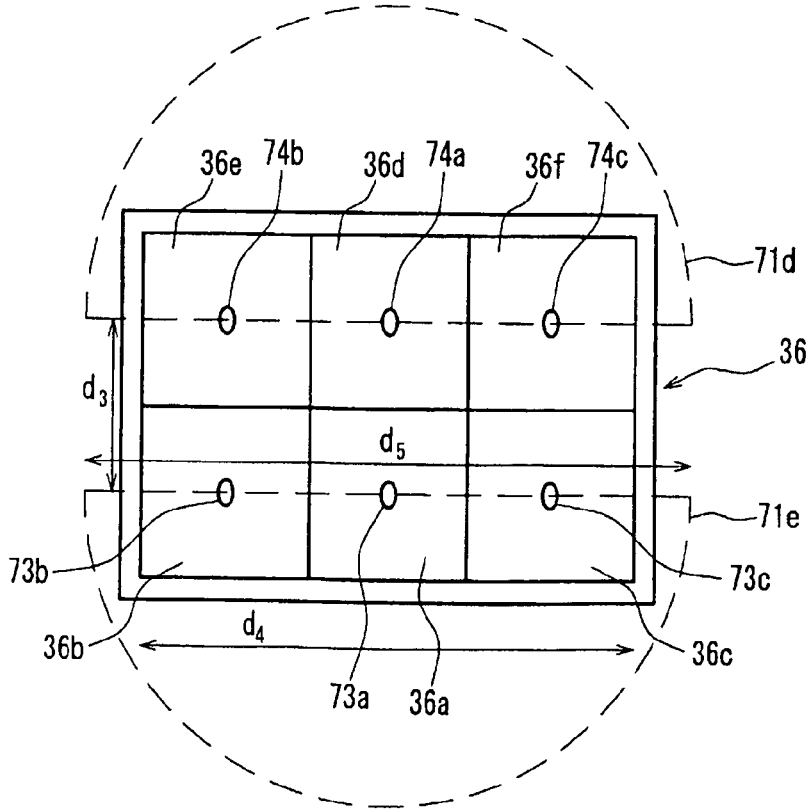
FIG. 12 shows the relationship between the optical detector and the beams in the optical pickup head according to the fourth embodiment of the present invention.

FIG. 12 shows the relationship between the optical detector 36 and the diffracted beams 73a, 73b, 73c, 74a, 74b, and 74c. The optical detector 36 has six light receiving portions 36a, 36b, 36c, 36d, 36e, and 36f for receiving the diffracted beams 73a, 73b, 73c, 74a, 74b, and 74c, respectively. The diffracted beams 73a, 73b, 73c, 74a, 74b, and 74c created by the diffraction grating 62 are arranged such that they form focal points on the surface formed by the light receiving portions of the optical detector 36. The spacing $d_3$ on the optical detector 36 between adjacent beams (for example, the spacing between 73a and 73b or 73a and 74a) is 80 μm.

The Airy disk diameter w of a focused Gaussian beam, in general, is given by w=1.22×(light source wavelength)/(lens numerical aperture). In the fourth embodiment the main beam 70a and the sub-beams 70b and 70c are split into two beams by the diffraction grating 62, so that the diameter on the optical detector 36 in the direction not split (vertical diameter) is 13 μm and the diameter in the direction split (horizontal diameter) is 26 μm.

Crosstalk caused by the diffracted beams 73a and 74a created from the main beam 70a mixing into the light receiving portions 36b, 36c, 36e, and 36f for receiving the diffracted beams 73b, 74b, 73c, and 74c created from the sub-beams 70b and 70c fluctuates when the optical storage medium 41 tilts or the beams are unfocused, and may make the tracking unstable. Also, when the beams split into two mix into the other light receiving portions, the amplitude of the TE signal drops. In both cases, making the spacing between the each of beams three or more times the Airy disk diameter makes the impact insignificant enough that it may be ignored and makes stable tracking control possible.

If the optical storage medium 41 is a two-layered recording disk having two information recording planes, then, with the optical pickup head of the fourth embodiment, there is hardly any offset caused in the TE signals even during tracking or when the optical storage medium is tilted, because the diameter $d_5$ on the optical detector 36 of the beams 71d and 71e reflected by the non-focus plane is made larger than the width $d_4$ of the light receiving portions 36a, 36b, and 36c of the optical detector 36. Thus, by using the optical pickup head of the fourth embodiment it is possible to achieve a highly reliable information recording/reproducing apparatus. Here, the diffracted beams of the sub-beams 70b and 70c that are reflected by the non-focus plane have been omitted.

Also, like in the second embodiment, the substrate of the light source and the tracks on the optical storage medium can be positioned optically parallel so as to eliminate the effect of the beam 75 of spontaneously emitted light and obtain an optical pickup head without offset fluctuations in the TE signals.

Fifth Embodiment

The optical pickup head according to a fifth embodiment of the present invention will be described with reference to the drawings.

Figure 13:
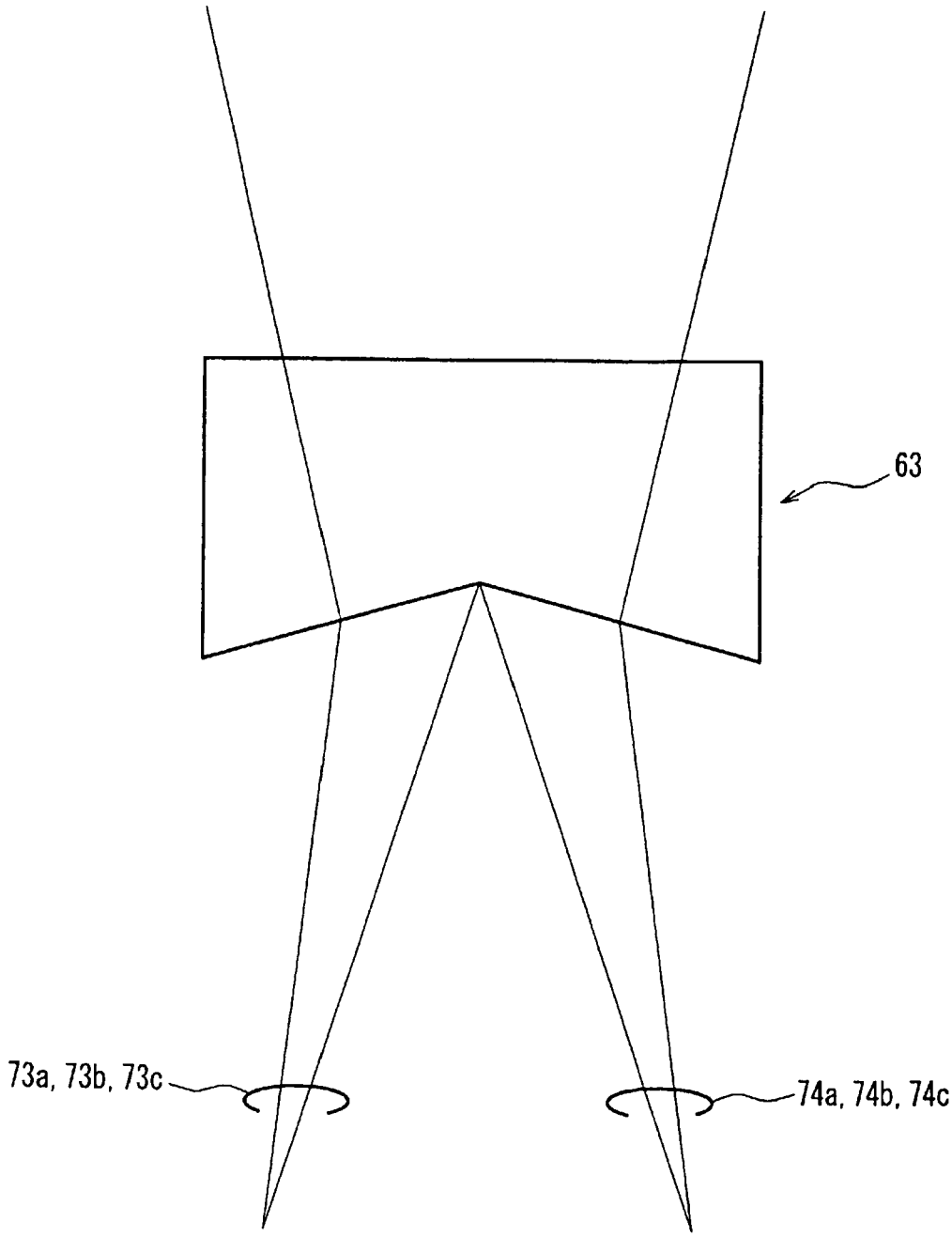
FIG. 13 shows the structure of the prism in the optical pickup head according to the fifth embodiment of the present invention.

FIG. 13 shows the configuration of a prism according to the fifth embodiment. The optical pickup head of the fifth embodiment uses a prism 63 in place of the diffraction grating 62 employed as a beam splitting element in the optical pickup head of the fourth embodiment.

Using the prism 63 to split the beams does not create unnecessary diffracted light, as is the case when the diffraction grating 62 is used. Thus, light utilization efficiency can be increased, the signal-to-noise ratio of the detected signals can be made larger, and information recorded to an optical storage medium can be reproduced with greater fidelity.

Sixth Embodiment

The optical pickup head according to a sixth embodiment of the present invention will be described with reference to the drawings. The optical pickup head of the sixth embodiment has the same configuration as that of the fourth embodiment, but differs therefrom in that it is provided with a diffraction grating 64 in place of the diffraction grating 62 and an optical detector 37 in place of the optical detector 36.

Figure 14:
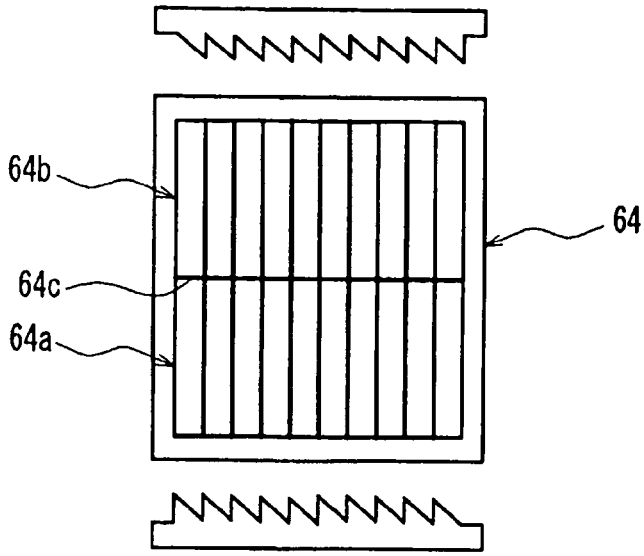
FIG. 14 is a structural diagram of the diffraction grating of the optical pickup head according to the sixth embodiment of the present invention.
Figure 15:
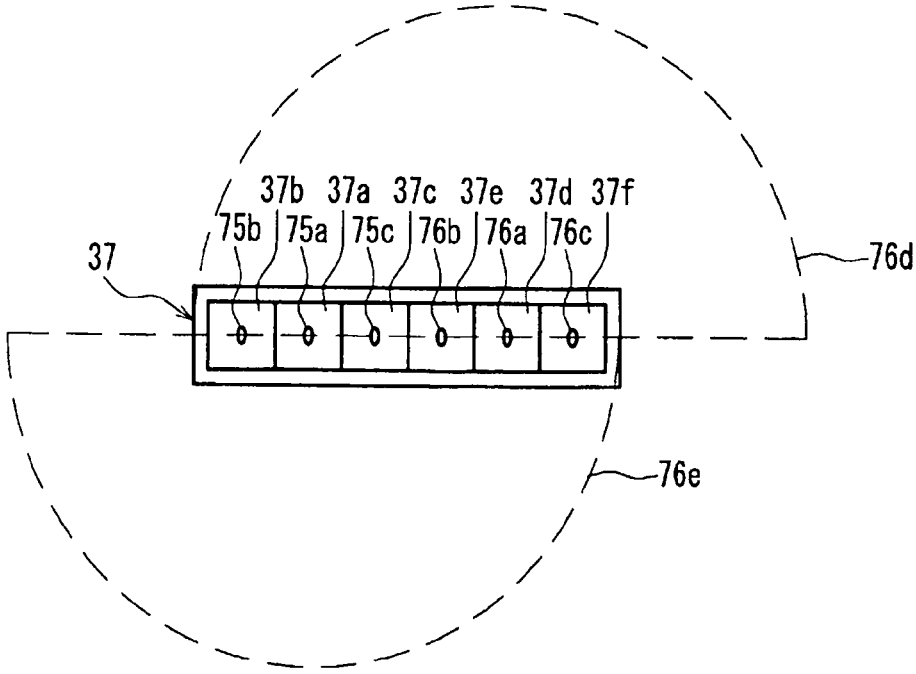
FIG. 15 shows the relationship between the optical detector and the beams in the optical pickup head according to the sixth embodiment of the present invention.

FIG. 14 is a diagram of the configuration of the diffraction grating 64 according to the sixth embodiment. FIG. 15 shows the relationship between the optical detector 37 and the beams.

The diffraction grating 64 has two types of sawtooth patterned regions 64a and 64b. A boundary 64c between the patterns 64a and 64b has a parallel relationship to the image on the tracks on the optical storage medium 41 by the main beam 70a and the sub-beams 70b and 70c. The difference between the diffraction grating 62 of the fourth embodiment and the diffraction grating 64 of the sixth embodiment is the orientation and periodicity of the grating. The pattern 64a creates diffracted beams 75a, 75b, and 75c and the pattern 64b creates diffracted beams 76a, 76b, and 76c. The diffracted beams 75a and 76a are created from the main beam 70a, the diffracted beams 75b and 76b are created from the sub-beam 70b, and the diffracted beams 75c and 76c are created from the sub-beam 70c.

As shown in FIG. 15, the optical detector 37 has light receiving portions 37b, 37a, 37c, 37e, 37d, and 37f lined up in a row in that order for receiving the diffracted beams 75b, 75a, 75c, 76b, 76a, and 76c, respectively. The size of each of the light receiving portions 37a, 37b, 37c, 37d, 37e, and 37f is the same as that of each of the light receiving portions 36a, 36b, 36c, 36d, 36e, and 36f of the optical detector 36 of the fourth embodiment. The diffracted beams 75a, 75b, 75c, 76a, 76b, and 76c created by the diffraction grating 64 are positioned so as to form a focal point on the optical detector 37.

Beams 76d and 76e are diffracted beams created by the main beam 70a reflected by the non-focus plane being incident on the diffraction grating 64. For the sake of simplification, the diffracted beams of the sub-beams 70b and 70c reflected by the non-focus plane are omitted here. Movement of the objective lens during tracking moves the image of the beams 76d and 76e on the optical detector 37. However, since the optical detector 37 is structured with the light receiving portions 37a, 37b, 37c, 37d, 37e, and 37f lined up in a row, the beams 76d and 76e are incident on the light receiving portions evenly, and thus are cancelled during the calculations for detecting TE signals, and no offset is generated in the TE signals. Thus, the TE signals are hardly offset even during tracking or when the optical storage medium is tilted, for example. Consequently, a highly reliable information recording/reproducing apparatus can be achieved.

Seventh Embodiment

The optical pickup head according to a seventh embodiment of the present invention will be described with reference to the drawings. The optical pickup head of the seventh embodiment has the same configuration as the optical pickup head of the sixth embodiment, but is different therefrom in that it is provided with a diffraction grating 65 in place of the diffraction grating 64 and an optical detector 38 in place of the optical detector 37.

Figure 16:
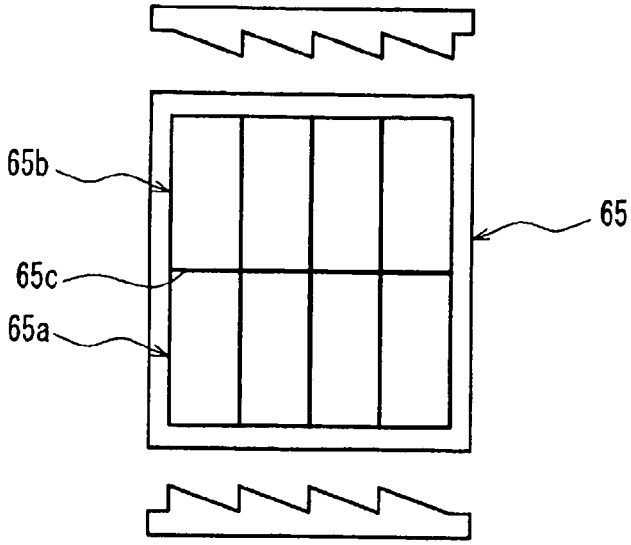
FIG. 16 is a structural diagram of the diffraction grating of the optical pickup head according to the seventh embodiment of the present invention.
Figure 17:
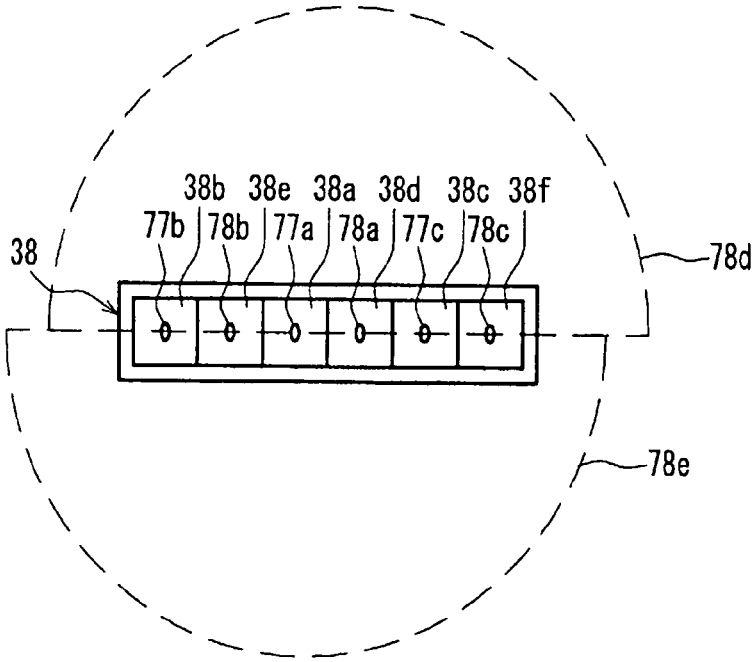
FIG. 17 shows the relationship between the optical detector and the beams in the optical pickup head according to the seventh embodiment of the present invention.

FIG. 16 shows the structure of the diffraction grating 65 of the seventh embodiment. FIG. 17 illustrates the relationship between the optical detector 38 and the beams.

The diffraction grating 65 has two types of sawtooth patterned regions 65a and 65b, as does the diffraction grating 64 of the sixth embodiment. A boundary 65c between the patterns 65a and 65b has a parallel relationship to the image created on the tracks on the optical storage medium 41 by the main beam 70a and the sub-beams 70b and 70c. The diffraction grating 65 and the diffraction grating 64 have a different grating periodicity, with the diffraction grating 65 having a wider sawtooth profile than the diffraction grating 64.

The pattern 65a creates diffracted beams 77a, 77b and 77c and the pattern 65b creates diffracted beams 78a, 78b and 78c. The diffracted beams 77a and 78a are created from the main beam 70a, the diffracted beams 77b and 78b are created from the sub-beam 70b, and the diffracted beams 77c and 78c are created from the sub-beam 70c.

As shown in FIG. 17, the optical detector 38 has light receiving portions 38b, 38e, 38a, 38d, 38c, and 38f lined up in a row in that order for receiving the diffracted beams 77b, 78b, 77a, 78a, 77c, and 78c, respectively. Because the diffraction grating 65 is used, the diffracted beam 77a is positioned between the diffracted beams 78a and 78b and the diffracted beam 78a is positioned between the diffracted beams 77a and 77c. The light receiving portions 38a, 38b, 38c, 38d, 38e, and 38f are the same size as the light receiving portions 37a, 37b, 37c, 37d, 37e, and 37f of the optical detector of the sixth embodiment. Also, they are arranged such that the diffracted beams 77a, 77b, 77c, 78a, 78b, and 78c created by the diffraction grating 65 form focal points on the optical detector 38.

Beams 78d and 78e are diffracted beams created by the main beam 70a that is reflected by the non-focus plane being incident on the diffraction grating 65. For ease of understanding, the diffracted beams of the sub-beams 70b and 70c that are reflected by the non-focus plane are omitted here. If the optical storage medium 41 is a two-layered recording disk, then depending on the settings for the spacing between the two information recording planes and the numerical aperture of the objective lens, a large spherical aberration is imparted on the beam reflected by the non-focus plane. For example, when the spacing between the two information recording planes is 40 μm and the numerical aperture of the objective lens is 0.85, the beams 78d and 78e reflected by the non-focus plane form a large distorted spot on the optical detector 38 and the distortion increases when the position of the objective lens is moved during tracking. However, because the optical pickup head has the above configuration, offset remaining in the TE signals is significantly reduced.

In the seventh embodiment, since the light receiving portions for outputting the signals for performing differential calculations are disposed adjacent to one another, such as the light receiving portions 38c and 38f, adjacent light receiving portions receive light substantially equally even if the beams 78d and 78e reflected by the non-focus plane are distorted on the optical detector 38. Thus, hardly any offset is generated in the TE signals even during tracking or when the optical storage medium is tilted, for example, and by using the optical pickup head of the seventh embodiment it is possible to obtain a more highly reliable information recording/reproducing apparatus.

A configuration is also possible in which the spacing between the main beam 70a and the sub-beams 70b and 70c is designed to be wider and spaces are provided between the light receiving portions 38a and 38e and between the light receiving portions 38d and 38c. This makes the spacing on the optical detector 38 between the diffracted beam 77a created from the main beam 70a and the diffracted beam 78b created from the sub-beam 70b or between the diffracted beam 78a created from the main beam 70a and the diffracted beam 77c created from the sub-beam 70c wider than the spacing between the diffracted beams 77a and 78a created from the main beam 70a. Consequently, because the spacing on the focus plane between the main beam and the sub-beams is wider, drops in the amplitude of the tracking error signal due to eccentricity on the optical storage medium 41, for example, occur more readily, but on the other hand, cross-talk from the main beam mixing into the light receiving portions for receiving the sub-beams can be reduced, even when the beam focused on the focus plane is out of focus or when a large aberration is added to the beam on its path from being reflected by the focus plane and arriving at the optical detector 38 because of tolerances during assembly of the optical pickup head or residual aberration in the components that are used. Thus, tracking error signals with even less offset can be obtained. Furthermore, an inexpensive optical pickup head can be provided because greater tolerances can be allowed during assembly of the optical pickup head.

It should be noted that in the third to seventh embodiments, the diffraction gratings and prisms for splitting the beam in two can be fabricated inexpensively by resin molding. Also, the optical storage medium is not limited to a disk, and may be of various shapes, such as a card, in accordance with the application. Moreover, the optical pickup head of the present invention also can be adopted without a problem for optical storage media having three or more information recording layers.

Eighth Embodiment

The optical pickup head according to an eighth embodiment of the present invention will described with reference to the drawings.

Figure 18:
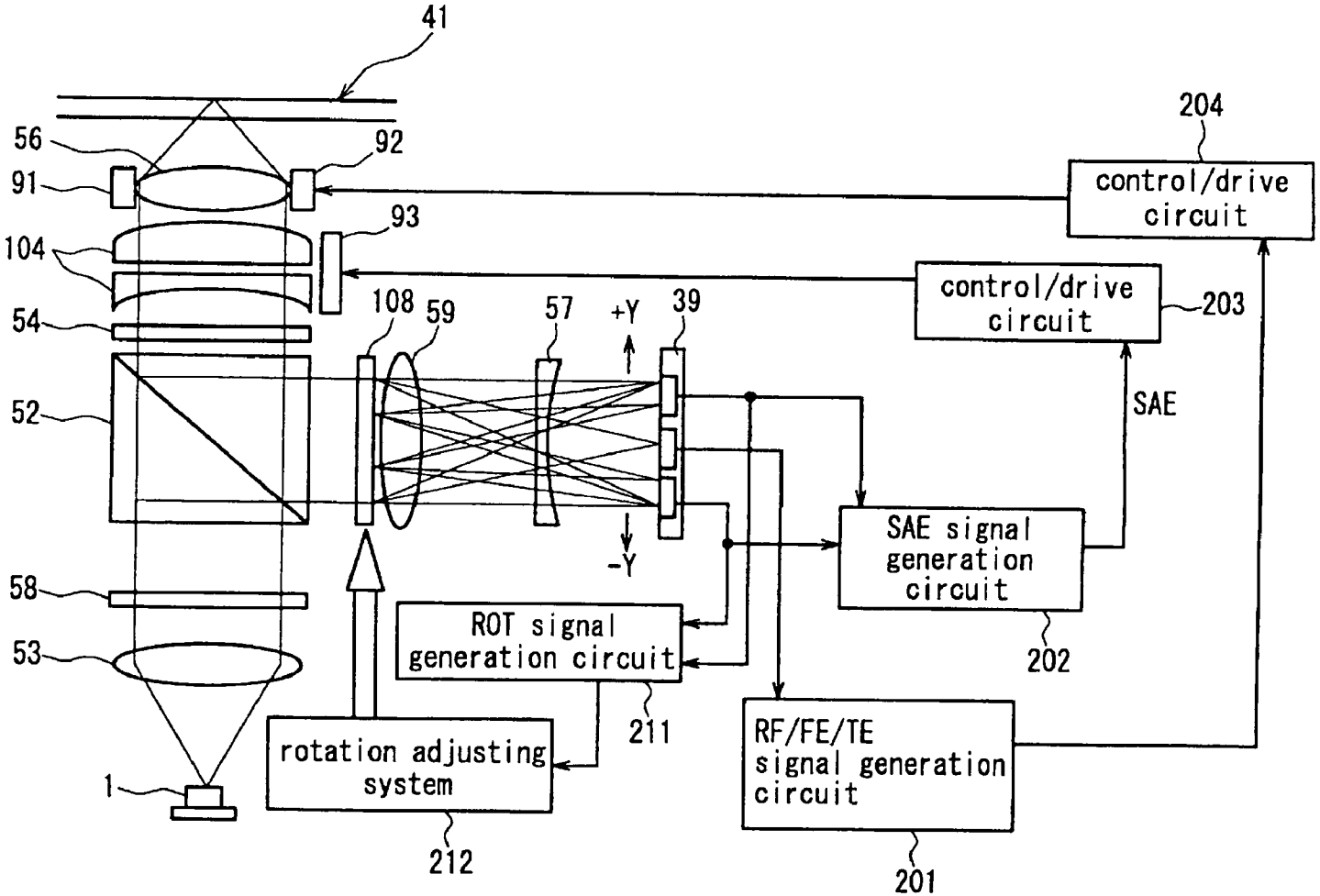
FIG. 18 shows the configuration of the optical pickup head according to the eighth embodiment of the present invention.

FIG. 18 shows the configuration of the optical pickup head according to the eighth embodiment of the present invention. The optical pickup head of the eighth embodiment separates the light reflected by the optical storage medium 41 into an internal beam and an external beam by a holographic element, obtains spherical aberration error (hereinafter, referred to as SAE) signals from the 1st order diffracted light of the holographic element, and obtains RF signals from the zero order diffracted light of the holographic element.

The beam emitted from the optical laser light source 1 is turned into a parallel beam by the collimating lens 53 and separated into the three beams of zero order diffracted light and +1st and −1st order diffracted light created by a diffraction grating 58. The beams are transmitted through a compound lens 104 made of a concave lens and a convex lens and serving as a spherical aberration correction means, the wave front is converted, and the beams are focused on the optical storage medium 41 by the objective lens 56. The three beams focused on the optical storage medium 41 are reflected/diffracted by the optical storage medium 41 and once again pass through the objective lens 56, the compound lens 104, and the quarter wavelength plate 54 and are incident on the beam splitter 52 and reflected.

The three beams reflected by the beam splitter 52 pass through a holographic element 108 serving as a branching means and are branched into +1st and −1st order diffracted beams and a zero order diffracted beam. After passing through the holographic element 108, the ratio of diffraction efficiency of the zero order diffracted beam to one of the 1st order diffracted beams is 20:1, so that the S/N ratio of the RF signals is good. The three beams of zero order diffracted light that passed straight through the holographic element 108 are focused by the detector lens 59, imparted with astigmatism by the cylindrical lens 57 in a direction of 45° relative to the track, and are received by the optical detector 39. The signals output from the optical detector 39 are input to an RF/FE/TE signal generation circuit 201.

The RF signals created and output by the RF/FE/TE signal generation circuit 201 are used for reproducing information recorded on the optical storage medium 41, and the FE signals and the TE signals are input into a control/drive circuit 204. The control/drive circuit 204 drives the actuators 91 and 92 for the objective lens 56 in accordance with the FE and TE signals that are input.

On the other hand, the +1st order beam and the −1st order beam of the main beam 70a that are created by the holographic element 108 are also focused by the detector lens 59, imparted with astigmatism by the cylindrical lens 57 in a direction of 45° relative to the track, and are received by the optical detector 39.

Signals output from the optical detector 39 due to these light beams are input to an SAE signal generation circuit 202, which outputs SAE signals based on these signals. The SAE signals are amplified and phase compensated by a control/drive circuit 203, after which they are supplied to an actuator 93. The actuator 93 changes the distance between the concave lens and the convex lens of the compound lens 104 serving as the spherical aberration correction means in order to keep the spherical aberration in the beams focused onto the optical storage medium 41 to a minimum level. The holographic element 108 and the SAE signal generation circuit 202 together make up a spherical aberration detecting means.

Figure 19:
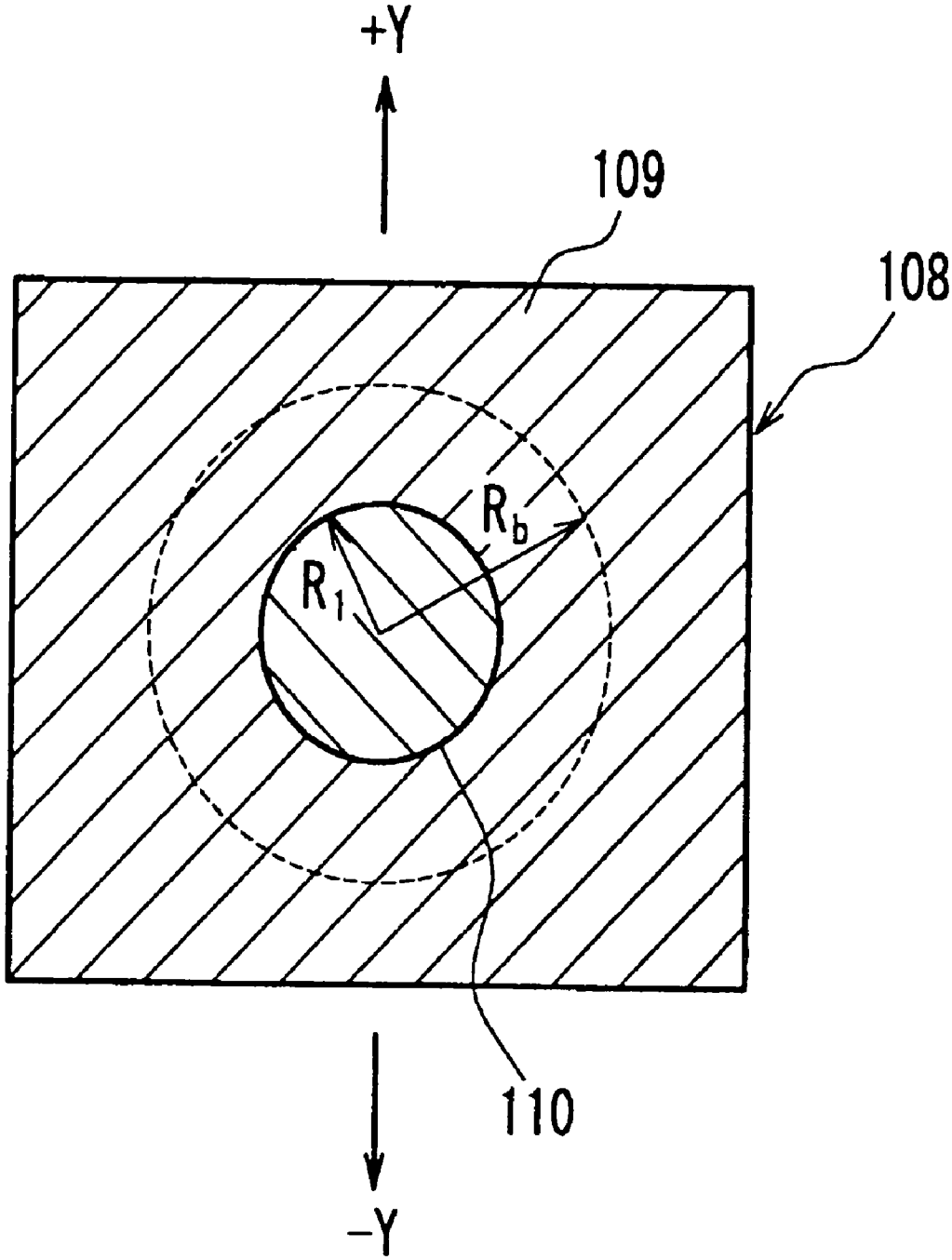
FIG. 19 shows the structure of the holographic element in the optical pickup head according to the eighth embodiment of the present invention.

FIG. 19 shows the structure of the holographic element 108. Diffraction gratings, each with a different grating spacing, are fabricated in a region 109 outside a circle with the radius $R_1$ and a region 110 inside the circle with the radius $R_1$. The projection onto the holographic element 108 of the beam reflected/diffracted by the optical storage medium 41 and passed through the objective lens 56 corresponds to the circle with the radius $R_b$ (broken line circle in FIG. 19). When $R_1/R_b$ is about 0.75, the area of the beam falling into the outer region 109 and the area of it that falls into the inner region 110 are substantially equal, and therefore the signal intensity is also substantially equal. At this time there is the highest detection sensitivity, that is, the highest degree of SAE signal change with respect to spherical aberration due to thickness discrepancies in the optical storage medium 41, for example. Consequently, $R_1/R_b$ is optimally about 0.75.

Figure 20:
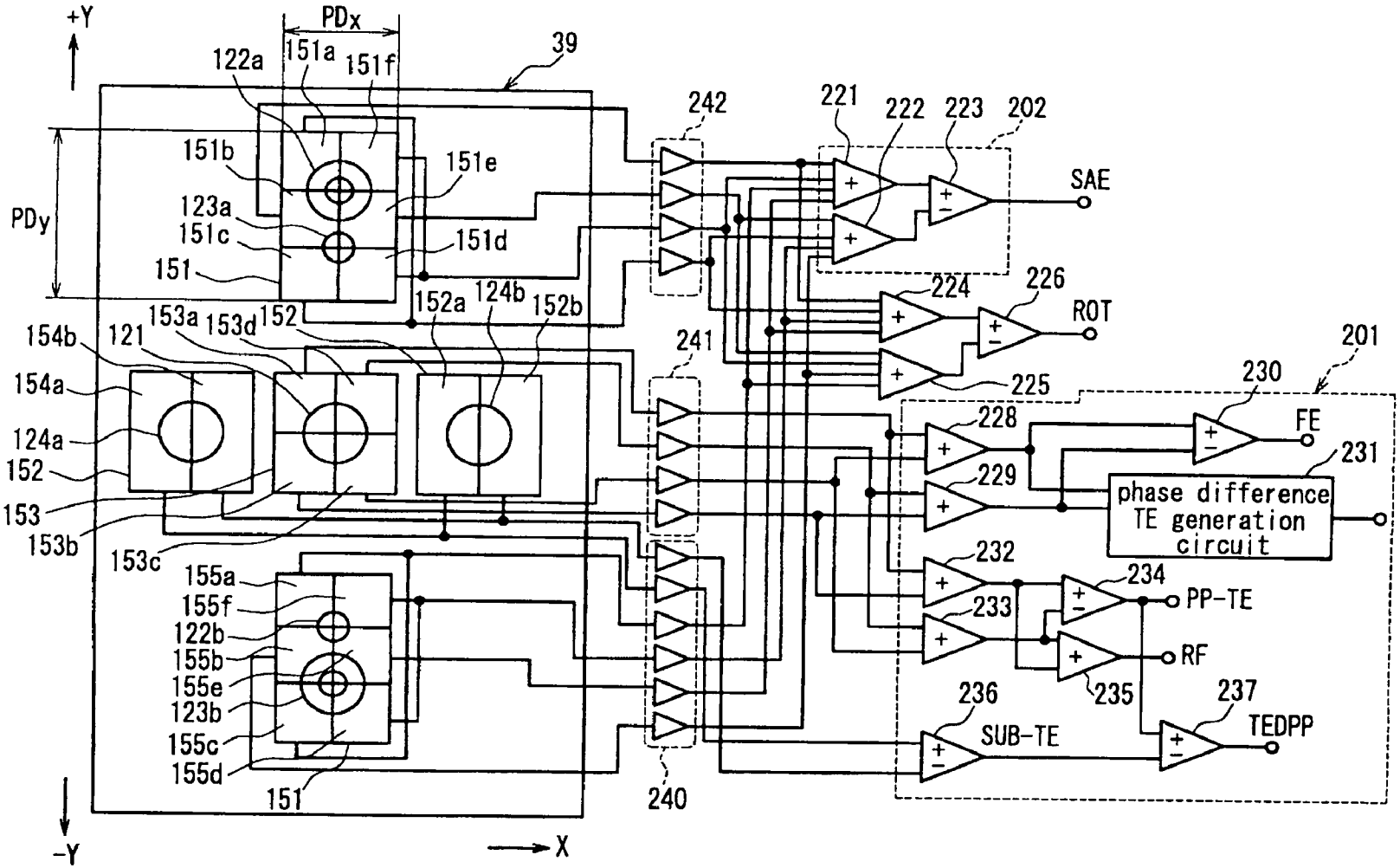
FIG. 20 shows the relationship between the optical detector and the beams, and the structure of the circuits, in the optical pickup head according to the eighth embodiment of the present invention.

FIG. 20 shows the relationship between the optical detector 39 and the beams and a detailed structural example of the RF/TE/FE signal generation circuit and the SAE signal generation circuit, for example, according to the eighth embodiment. Broadly speaking, the optical detector 39 has three light receiving portions. These are a main beam light receiving portion 153 made of light receiving portions 153a, 153b, 153c, and 153d, a sub-beam light receiving portion 152 made of light receiving portions 152a, 152b, 154a, and 154b, and an SAE signal light receiving portion 151 made of light receiving portions 151a, 151b, 151c, 151d, 151e, 151f, 155a, 155b, 155c, 155d, 155e, and 155f. The zero order light of the main beam 70a that passes through the holographic element 108 is a beam 121, the zero order light of the sub-beams 70b and 70c that pass through the holographic element 108 are beams 124a and 124b, and the beams of +1st and −1st order light of the main beam 70a that are diffracted by the region 109 of the holographic element 108 are beams 122a and 122b, respectively, and the beams of +1st and −1st order light that are diffracted by region 110 are beams 123a and 123b, respectively.

The light receiving portions 153a, 153b, 153c, and 153d receive the beam 121 and output a current signal corresponding to that light amount. A current/voltage conversion circuit 241 converts the current signal into a voltage signal and outputs it. An adder 228 adds the signals output from the light receiving portion 153a and the light receiving portion 153c disposed at opposite corners of the main beam light receiving portion 153, which is in the shape of a square partitioned into four quadrants. An adder 229 adds the signals output from the other light receiving portions 153b and 153d disposed at opposite corners of the main beam light receiving portion 153, which is in the shape of a square partitioned into four quadrants.

A differential circuit 230 outputs a signal of the difference between the signal output from the adder 228 and the signal output from the adder 229, that is, it outputs an FE signal. A phase difference TE generation circuit 231 receives the signals output from the adders 228 and 229, compares their phase, and outputs a phase difference TE signal. An adder 232 adds the signals output from the light receiving portions 153a and 153b disposed on one side of the main beam light receiving portion 153, which is in the shape of a square partitioned into four quadrants, and an adder 233 adds the signals output from the light receiving portions 153c and 153d disposed on the other side of the main beam light receiving portion 153, which is in the shape of a square partitioned into four quadrants. A differential circuit 234 outputs a signal of the difference between the signal output from the adder 232 and the signal output from the adder 233, that is, it outputs a push-pull TE signal (PP-TE). Also, an adder 235 outputs a signal of the total of the signals from the adder 232 and the adder 233, that is, it outputs an RF signal for reproducing information recorded on the optical storage medium.

The light receiving portions 152a, 152b, 154a, and 154b are for receiving the beams 124a and 124b and outputting current signals corresponding to the amount of light in the beams. A current/voltage conversion circuit 240 receives the current signals and outputs voltage signals. A differential circuit 236 outputs a signal of the difference between the sum signal of the light receiving portions 152a and 154a and the sum signal of the light receiving portions 152b and 154b, that is, it outputs a sub-beam 70b and 70c TE signal (SUB-TE).

A differential circuit 237 receives the signals output from the differential circuit 234 and the differential circuit 236 and outputs a signal of the difference in those signals. This is a TE signal for DPP (TEDPP). Thus, the RF/FE/TE signal generation circuit 201 is made of the adders 228, 229, 232, 233, and 235, the differential circuits 230, 234, 236, and 237, and the phase difference TE generation circuit 231.

The light receiving portions 151a, 151b, 151c, 151d, 151e, and 151f receive the beams 122a and 123a and output current signals corresponding to the amount of light that is received. Also, the light receiving portions 155a, 155b, 155c, 155d, 155e, and 155f receive the beams 122b and 123b and output current signals corresponding to the amount of light that is received. A current/voltage conversion circuit 242 receives these current signals and outputs voltage signals. An adder 221 adds the signals output from the light receiving portions 151b, 151d, and 151f, and the light receiving portions 155a, 155c, and 155e. Also, an adder 222 adds the signals output from the light receiving portions 151a, 151c, and 151e, and the light receiving portions 155b, 155d, and 155f. A differential circuit 223 outputs a signal of the difference between the signal output from the adder 221 and the signal output from the adder 222. This becomes the SAE signal. The SAE signal generation circuit 202 is made of the two adders 221 and 222 and the differential circuit 223.

On the other hand, an adder 224 adds the signals output from the light receiving portions 151a, 151b, 151c, and the light receiving portions 155d, 155e, and 155f. Also, an adder 225 adds the signals output from the light receiving portions 151d, 151e, and 151f, and the light receiving portions 155a, 155b, and 155c. A differential circuit 226 outputs a signal of the difference between the signal output from the adder 224 and the signal output from the adder 225. This signal becomes a rotation error signal (hereinafter, referred to as ROT) expressing the rotation disparity between the beams 122a and 122b, 123a and 123b, and the light receiving portions 151a, 151b, 151c, 151d, 151e, and 151f, 155a, 155b, 155c, 155d, 155e, and 155f. The ROT signal is used for adjusting, during adjustment of the head, the angle of the rotation direction of the optical detector 39 and the holographic element 108 for creating a beam for spherical aberration. If the value of this angle is adjusted to zero, then the holographic element 108 is set in the correct position with respect to the optical detector 39.

As shown in FIG. 20, in the case of detecting SAE signals and TE signals by DPP, the beams 124a and 124b, which are the sub-beams 70b and 70c for DPP, and the beams 122a, 122b, 123a, and 123b for detection of the SAE signal are positioned on the optical detector 39 in a substantially perpendicular direction to the beam 121, which is the main beam 70a. Thus, interference between the beams 124a and 124b for DPP and the beams 122a, 122b, 123a, and 123b for detection of the SAE signal can be minimized. It should be noted that in the example shown here, the beams 124a and 124b, which are the sub-beams 70b and 70c, are used for DPP, however, the effect of minimizing interference also can be obtained through adopting this arrangement even if the sub-beams 70b and 70c are used for tracking in a three-beam method.

Moreover, lining up and detecting the light of the inner region 110 and the light of the outer region 109 makes it possible to use jointly the two outside light receiving portions for detecting the light of the inner region 110 and the two inside light receiving portions for detecting the light of the outer region 109. The light receiving portions thus can be reduced, so that smaller and simpler light receiving portions can be achieved. Accordingly, the optical pickup head can be made smaller.

Also, the zero order light of the main beam 70a reflected by the non-focus plane spreads substantially circularly, the radius $R_s$ thereof being expressed by $R_s=2\cdot d\cdot NA\cdot\alpha$, where d is the optical spacing between the two layers of the disk, NA is the numerical aperture of the information storage medium side of the condensing optical system, and $\alpha$ is the lateral magnification of the return path from the condensing optical system to the detector.

There are local discrepancies in the amount of light reflected by the non-focus plane, and changes in the light's position on the optical detector 39 due to lens shift or disk tilt, for example, result in error in the SAE signal. Such discrepancies constitute about several percent of the total light amount, so that if the amount of light reflected by the non-focus plane and the amount of light on the focus plane originally intended for detection are substantially the same, then the effect on the SAE signal is also about several percent. Consequently, the area $S_2$ of the light receiving portion of the optical detector 39 for obtaining the SAE signal is given as $S_2=2PD_x\cdot PD_y$, where $S_2\leqq\pi\cdot R_s\cdot R_s\cdot\eta_{ss}/\eta_{ms}$ as should be fulfilled. That is, $S_2\leqq 4\cdot\pi\cdot(d\cdot NA\cdot\alpha)^2\cdot\eta_{ss}/\eta_{ms}$. Here, $PD_x$ and $PD_y$ are the length in the X direction and the length in the Y direction of the light receiving portion made of the light receiving portions 151a, 151b, 151c, 151d, 151e, and 151f, $\eta_{ss}$ is the amount of light used for SAE detection, and $\eta_{ms}$ is the amount of zero order light of the main beam 70a.

In an optical system where this relationship is fulfilled, SAE signal error is small even if there is light reflected from the non-focus plane, and information on the focus plane can be read and recorded accurately. Moreover, as is the case when detecting TE signals, the larger the lateral magnification $\alpha$, the more the amount of stray light can be reduced.

On the other hand, by combining the detector lens and the cylindrical lens for an astigmatic difference (distance between front focal line and rear focal line) of the focused beam of $Z_0$ and a refractive index of the substrate or the intermediate layer of n, then the range of detection $\Delta z$ of the FE signal with respect to optical storage medium 41 displacement is given as $\Delta z=Z_0/2/\alpha^2$ and the range of detection $\Delta t$ of the SAE signal with respect to a thickness error in the substrate or intermediate layer is given as $\Delta t=Z_0\cdot n^3/\alpha^2/(n^2-1)/NA^2$. Both $\Delta z$ and $\Delta t$ become smaller when the lateral magnification $\alpha$ is increased, so that if the lateral magnification $\alpha$ is made too large the range of detection for the FE signal or the SAE signal is narrowed and the focus servo and the spherical aberration correction servo become unstable. Consequently, when a desired range of detection is given for $\Delta z$ and $\Delta t$, if the lateral magnification $\alpha$ fulfills the equation $S_1\cdot\eta_m\cdot R_{dfo}/(4\cdot\pi\cdot d^2\cdot NA^2\cdot\eta_s\cdot R_{fo})\leqq\alpha\leqq(Z_0\cdot n^3/\Delta t/(n^2-1)/NA^2)^{1/2}$ in a case where the TE signals and the SAE signals are detected by DPP using the same detector lens and cylindrical lens, and fulfills the equation $S_1\cdot\eta_m\cdot R_{dfo}/(4\cdot\pi\cdot d^2\cdot NA^2\cdot\eta_s\cdot R_{fo})\leqq\alpha\leqq(Z_0/2/\Delta z)^{1/2}$ in a case where the TE signals and the FE signals are detected by DPP using the same detector lens and cylindrical lens, then servo operations for controlling focus, tracking, and spherical aberration correction are performed stably.

Here, when $\lambda$ is the wavelength of the light source, then $\Delta z$ is three to ten times $\lambda/2/NA^2$, and $\Delta t$ is five to thirty times $\lambda/NA^4$.

It should be noted that absolutely no restrictions have been placed on the method for SAE signal detection according to the optical pickup head of the eighth embodiment, and it goes without saying that a variety of different methods, such as any of the methods set forth in Japanese Patent Application No. 2001-294622, can be adopted.

Also, the configuration presented here was one in which the beams were imparted with astigmatism, but other FE signal detection methods such as spot size detection also can be employed suitably. In the case of spot size detection, the spacing between the focal points of the two beams is equal to the astigmatic difference in the astigmatism method, and the spacing between the focal points of the two beams can be assigned as $Z_0$.

The optical pickup head can be used similarly for an optical storage medium having three or more recording layers.

In a case where the optical storage medium has three or more recording layers, the main beam 70a is reflected by each of the non-focus planes (number of recording layers minus one) and the total amount of light that is incident on the light receiving portions for receiving the sub-beams should have the aforementioned relationship with respect to the amount of light of the sub-beams 70b and 70c.

Ninth Embodiment

Figure 21:
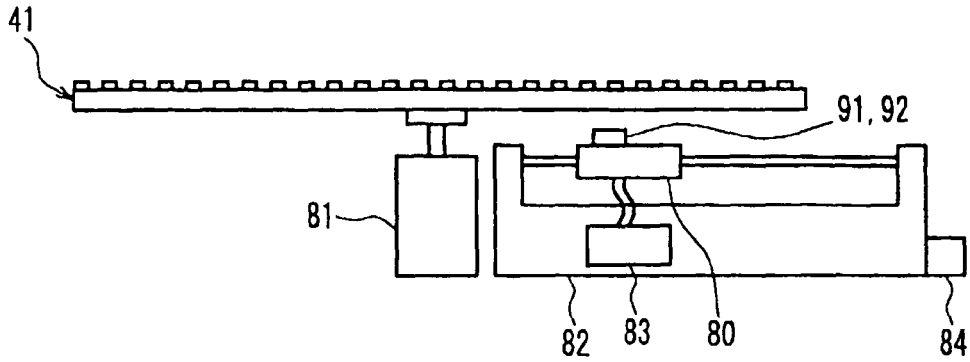
FIG. 21 shows the configuration of the information recording/reproducing apparatus according to the ninth embodiment of the present invention.
Figure 22:
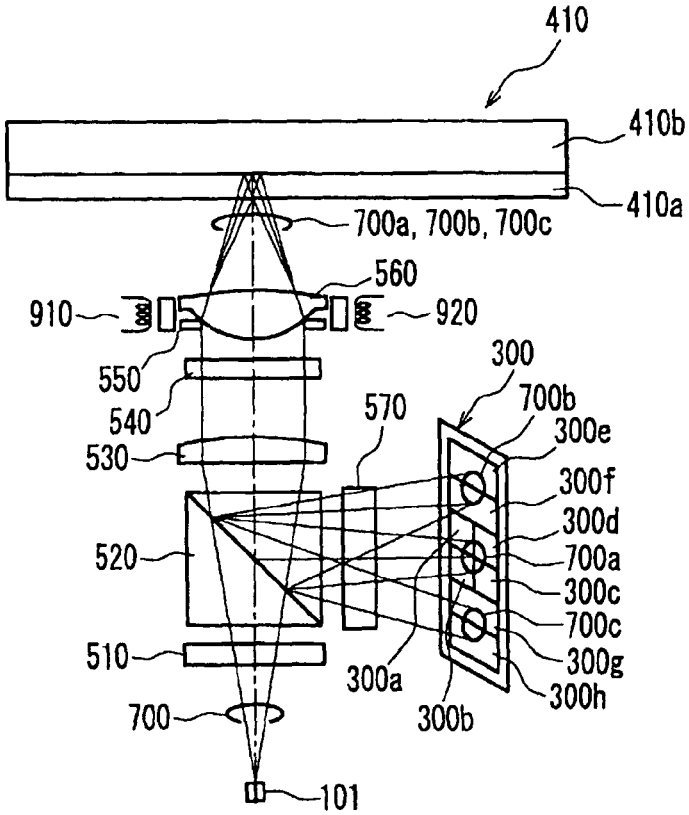
FIG. 22 PRIOR ART
FIG. 22 shows the configuration of a conventional optical pickup head.
Figure 23:
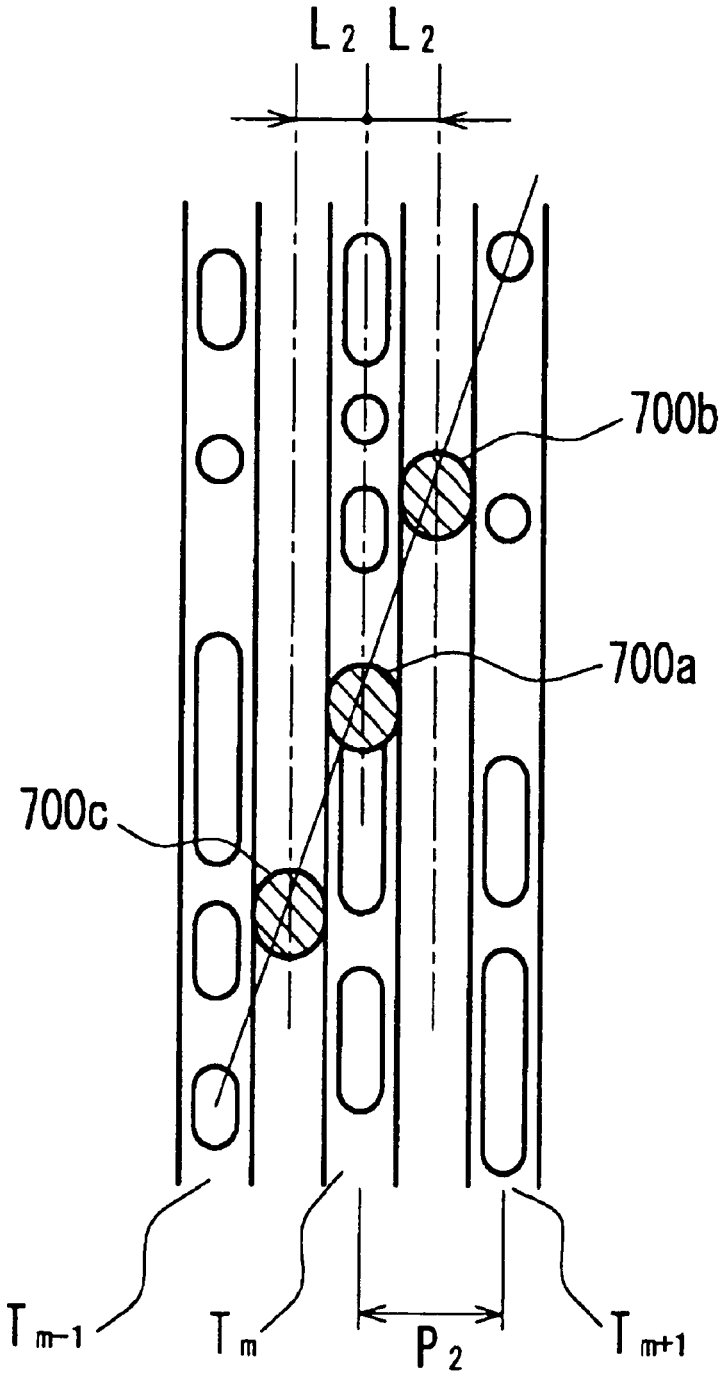
FIG. 23 PRIOR ART
FIG. 23 shows the relationship between the tracks and the beams on the optical storage medium in the conventional optical pickup head.

An information recording/reproducing apparatus according to a ninth embodiment of the present invention will be described with reference to the drawings. FIG. 21 shows the configuration of the information recording/reproducing apparatus with optical pickup head according to the ninth embodiment. The information recording/reproducing apparatus is made of an optical pickup head 80, an optical storage medium drive portion 81, an optical pickup head drive apparatus portion 82, an electrical circuitry portion 83, and a power source portion 84. Any of the optical pickup heads according to the first to eighth embodiments may be used for the optical pickup head 80.

The optical storage medium drive portion 81 is for rotating the storage medium 41. Signals corresponding to the positional relationship between the optical pickup head 80 and the storage medium 41 are sent to the electrical circuitry portion 83. The electrical circuitry portion 83 amplifies or calculates the signals corresponding to this positional relationship, based on which it slightly moves the optical pickup head 80 or the objective lens (not shown) in the optical pickup head 80.

The optical pickup head 80 reads out information stored on the storage medium 41 and sends those signals to the electrical circuitry portion 83. In the electrical circuitry portion 83 the information stored on the storage medium 41 is demodulated from the signals that have been sent. The actuators 91 and 92 drive the objective lens in the optical pickup head 80. With these signals and the optical pickup head drive portion 82 or the actuators 91 and 92, the focus servo and the tracking servo are performed with respect to the storage medium 41, and information is read out, written, or erased. The power source portion 84, which is the power source or an external power source, for example, supplies power to the electrical circuitry portion 83, the optical pickup head drive apparatus portion 82, the optical storage medium drive portion 81, and the actuators 91 and 92. Terminals connected to the power source or an external power source can be provided at each of the drive circuits.

An effect of the optical pickup head of the present invention is that it does not generate offset in the TE signals, even if the objective lens is tracked, when recording and reproducing multi-layered disks having two or more layers.

An effect of the information recording/reproducing apparatus of the present invention is that it is possible to achieve an information recording/reproducing apparatus that does not generate offset in the TE signals, even if the objective lens is tracked, when recording and reproducing multi-layered disks having two or more layers.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description. All changes that come within the meaning and range of equivalency of the claims are intended to be embraced therein.

What is claimed is:

1. An optical pickup head, comprising:

a light source for emitting a light beam;

a diffracting means for creating a plurality of diffracted beams from the beam emitted by the light source;

a converging means for focusing the plurality of diffracted beams from the diffracting means onto an optical storage medium;

a beam branching means for branching a plurality of beams of the plurality of diffracted beams focused onto the optical storage medium and reflected by the optical storage medium; and an optical detecting means for receiving the beams branched at the beam branching means and outputting a signal corresponding to the amount of light of the received beams;

wherein the optical detecting means has main beam light receiving portions for receiving zero order diffracted beams and sub-beam light receiving portions for receiving first or higher order diffracted beams of the plurality of focused diffracted beams;

wherein the optical storage medium has a plurality of information recording planes and guide grooves are formed in at least one of the information recording planes; and wherein the amount of light of the first or higher order diffracted beams focused by the converging means when they are substantially focused on and reflected by a focus plane of the plurality of information recording planes is equal to or greater than the amount of light of the zero order diffracted beam focused by the converging means when it is reflected without focusing thereon by a non-focus plane other than the focus plane of the plurality of information recording planes.

2. An optical pickup head, comprising:

a light source for emitting a light beam;

a diffracting means for creating a plurality of diffracted beams from the beam emitted by the light source;

a converging means for focusing the plurality of diffracted beams from the diffracting means onto an optical storage medium;

a beam branching means for branching a plurality of beams of the plurality of diffracted beams focused onto the optical storage medium and reflected by the optical storage medium; and an optical detecting means for receiving the beams branched at the beam branching means and outputting a signal corresponding to the amount of light of the received beams;

wherein the optical storage medium has a plurality of information recording planes, guide grooves are formed in at least one of the information recording planes, and information is recorded on the guide grooves or between the guide grooves; and wherein the relationship $10 \cdot \eta_s \geqq \eta_m$ is fulfilled, where $\eta_m$ is a diffraction efficiency of a zero order diffracted beam of the diffracted beams created by the diffracting means and $\eta_s$ is a diffraction efficiency of first or higher order diffracted beams.

3. An optical pickup head, comprising:

a light source for emitting a light beam;

a diffracting means for creating a plurality of diffracted beams from the beam emitted by the light source;

a converging means for focusing the plurality of diffracted beams from the diffracting means onto an optical storage medium;

a beam branching means for branching a plurality of beams of the plurality of diffracted beams focused onto the optical storage medium and reflected by the optical storage medium; and an optical detecting means for receiving the beams branched at the beam branching means and outputting a signal corresponding to the amount of light in the received beams;

wherein the optical detecting means has main beam light receiving portions for receiving zero order diffracted beams and sub-beam light receiving portions for receiving first or higher order diffracted beams of the plurality of diffracted beams that are focused;

wherein the optical storage medium has a plurality of information recording planes, and guide grooves are formed in at least one of the information recording planes; and wherein all of the sub-beam light receiving portions are arranged within the image formed on the optical detecting means by the light of the zero order diffracted beam focused by the converging means that is reflected without focusing by the non-focus plane of the plurality of information recording planes.

4. An optical pickup head, comprising:

a light source for emitting a light beam;

a diffracting means for creating a plurality of diffracted beams from the beam emitted by the light source;

a converging means for focusing the plurality of diffracted beams from the diffracting means onto an optical storage medium;

a beam branching means for branching a plurality of beams of the plurality of diffracted beams focused onto the optical storage medium and reflected by the optical storage medium; and an optical detecting means for receiving the beams branched at the beam branching means and outputting a signal corresponding to the amount of light of the received beams;

wherein the optical detecting means has main beam light receiving portions for receiving zero order diffracted beams and sub-beam light receiving portions for receiving first or higher order diffracted beams of the plurality of diffracted beams that are focused;

wherein the optical storage medium has a plurality of information recording planes, and guide grooves are formed in at least one of the information recording planes; and wherein the relationship $S_1 \leqq 4\cdot\pi\cdot(d\cdot NA\cdot\alpha)^2\cdot\eta_s/\eta_m$ is fulfilled, where $\eta_m$ is a diffraction efficiency of zero order diffracted beams of the diffracted beams created by the diffracting means and $\eta_s$ is a diffraction efficiency of first or higher order diffracted beams, NA is a numerical aperture of the optical storage medium side of the converging means, $\alpha$ is a lateral magnification of an optical system on a return path from the optical storage medium to the optical detecting means, d is an optical spacing between two information recording planes of the optical storage medium, and $S_1$ is an area of one sub-beam light receiving portion.

5. An optical pickup head, comprising:

a light source for emitting a light beam;

a diffracting means for creating a plurality of diffracted beams from the beam emitted by the light source;

a converging means for focusing the plurality of diffracted beams from the diffracting means onto an optical storage medium;

a beam branching means for branching a plurality of beams of the plurality of diffracted beams focused onto the optical storage medium and reflected by the optical storage medium; and an optical detecting means for receiving the beams branched at the beam branching means and outputting a signal corresponding to the amount of light of the received beams;

wherein the optical detecting means has main beam light receiving portions for receiving zero order diffracted beams and sub-beam light receiving portions for receiving first or higher order diffracted beams of the plurality of diffracted beams that are focused;

wherein the optical storage medium has a plurality of information recording planes, and guide grooves are formed in at least one of the information recording planes; and wherein the relationship $S_1 \geqq 4\cdot\pi\cdot(d\cdot NA\cdot\alpha)^2\cdot\eta_s/\eta_m\cdot R_{fo}/R_{dfo}$ is fulfilled, where $\eta_m$ is a diffraction efficiency of zero order diffracted beams and $\eta_s$ is a diffraction efficiency of first or higher order diffracted beams of the diffracted beams created by the diffracting means, $R_{fo}$ is an effective reflectance of the focus plane of the information recording planes onto which the beams focused by the converging means substantially form a focal point, $R_{dfo}$ is an effective reflectance of a non-focus plane other than the focus plane of the plurality of information recording planes, NA is a numerical aperture of the optical storage medium side of the converging means, $\alpha$ is a lateral magnification of an optical system on a return path from the optical storage medium to the optical detecting means, d is an optical spacing between two information recording planes of the optical storage medium, and $S_1$ is an area of one sub-beam light receiving portion.

6. An optical pickup head, comprising:

a light source for emitting a light beam;

a diffracting means for creating a plurality of diffracted beams from the beam emitted from the light source;

a converging means for focusing the plurality of diffracted beams from the diffracting means onto an optical storage medium;

a beam branching means for branching a plurality of beams of the plurality of diffracted beams focused on the optical storage medium and reflected by the optical storage medium into two beams;

an astigmatism imparting means for imparting astigmatism on a first beam branched by the beam branching means;

a beam splitting means for further splitting a second beam branched by the beam branching means into two beams;

a first optical detecting means for receiving the beam from the astigmatism imparting means and outputting a signal corresponding to the amount of light of the received beam; and a second optical detecting means for receiving the beams from the beam splitting means and outputting a signal corresponding to the amount of light of the received beams;

wherein the optical storage medium has a plurality of information recording planes, and guide grooves are formed into at least one of the information recording planes; and wherein the beam splitting means splits the second beam in a direction parallel to the guide grooves.

7. The optical pickup head according to claim 6, wherein the diffracting means creates a zero order diffracted beam and first or higher order diffracted beams;

wherein the first beam includes the zero order diffracted beam and the first or higher order diffracted beam;

wherein the first optical detecting means has four light receiving portions; and wherein the zero order diffracted beam and the first or higher order diffracted beam are received by the light receiving portions overlappingly.

8. The optical pickup according to claim 6, wherein the first optical detecting means and the second optical detecting means each have light receiving portions for receiving the plurality of diffracted beams that have been focused;

wherein all of the light receiving portions of the first optical detecting means and the second optical detecting means are arranged within the images that are formed on the first optical detecting means and the second optical detecting means by the light of the zero order diffracted beams focused by the converging means that are reflected without forming a focal point by the non-focus plane of the plurality of information recording planes.

9. The optical pickup head according to claim 6, wherein the beam splitting means comprises a diffraction element.

10. The optical pickup head according to claim 6, wherein the beam splitting means comprises a prism.

11. The optical pickup head according to claim 6, wherein the beams are imaged substantially in focus on the first optical detecting means and the second optical detecting means.

12. The optical pickup head according to claim 11, wherein the size of the light receiving portions is not less than three and not more than ten times that of an Airy disk.

13. An optical pickup head, comprising:

a light source for emitting a light beam;

a diffracting means for creating a zero order diffracted beam and first or higher order diffracted beams from the beam emitted from the light source;

a converging means for focusing the zero order diffracted beam and the first or higher order diffracted beams from the diffracting means onto an optical storage medium;

a beam splitting means for respectively splitting into two beams the zero order diffracted beam and the first or higher order diffracted beams focused on the optical storage medium and reflected by the optical storage medium; and an optical detecting means for receiving the beams split by the beam splitting means and outputting a signal corresponding to the amount of light of the received beams;

wherein the optical detecting means has a plurality of light receiving portions positioned lined up in a row;

wherein the optical storage medium has a plurality of information recording planes, and guide grooves are formed in at least one of the information recording planes; and wherein the beam splitting means splits the beams with a splitting axis substantially parallel to the guide grooves.

14. The optical pickup head according to claim 13, wherein the light receiving portion for receiving the zero order diffracted beam of one of the beams split by the beam splitting means is positioned to be sandwiched between the light receiving portion for receiving the zero order diffracted beam of the other beam split by the beam splitting means and the light receiving portion for receiving the first or higher order diffracted beams of the other beam split by the beam splitting means.

15. The optical pickup head according to claim 14, wherein the spacing between the images formed on the optical detecting means by the zero order diffracted beam and the first or higher order diffracted beam of either one of the beams split by the beam splitting means is wider than the spacing between the images formed on the optical detecting means by the two zero order diffracted beams split by the beam splitting means.

16. The optical pickup head according to claim 13, wherein the beam splitting means comprises a diffraction element.

17. The optical pickup head according to claim 13, wherein the beam splitting means comprises a prism.

18. The optical pickup head according to claim 13, wherein the beams are imaged substantially in focus on the optical detecting means.

19. The optical pickup head according to claim 18, wherein the size of the light receiving portions is not less than three and not more than ten times that of an Airy disk.

20. An optical pickup head, comprising:

a light source for emitting a light beam;

a diffracting means for creating a plurality of diffracted beams from the beam emitted from the light source;

a converging means for focusing the plurality of diffracted beams from the diffracting means onto an optical storage medium;

a beam branching means for branching a plurality of beams of the plurality of diffracted beams focused on the optical storage medium and reflected by the optical storage medium;

an astigmatism imparting means for imparting astigmatism on the beams branched by the beam branching means; and an optical detecting means for receiving the beams imparted with astigmatism by the astigmatism imparting means and outputting a signal corresponding to the amount of light of the received beams;

wherein the optical detecting means has main beam light receiving portions for receiving zero order diffracted beams and sub-beam light receiving portions for receiving first or higher order diffracted beams of the plurality of diffracted beams that are focused;

wherein the optical storage medium has a plurality of information recording planes, and guide grooves are formed in at least one of the information recording planes; and wherein the relationship $S_1 \cdot \eta_m \cdot R_{dfo}/(4 \cdot \pi \cdot d^2 \cdot NA^2 \cdot \eta_s \cdot R_{fo}) \leqq \alpha \leqq (Z_0/2/\Delta z)^{1/2}$ is fulfilled, and $\Delta z$ is in the range of three to ten times $\lambda/2/NA^2$, where $Z_0$ is an astigmatic difference imparted by the astigmatism imparting means, $\eta_m$ is a diffraction efficiency of the zero order diffracted beams and $\eta_s$ is a diffraction efficiency of the first or higher order diffracted beams of the diffracted beams created by the diffracting means, $R_{fo}$ is an effective reflectance of the focus plane of the information recording planes onto which the beams focused by the converging means are substantially focused, $R_{dfo}$ is an effective reflectance of the non-focus plane other than the focus plane of the plurality of information recording planes, NA is a numerical aperture of the optical storage medium side of the converging means, $\alpha$ is a lateral magnification of an optical system on a return path from the optical storage medium to the optical detecting means, $\lambda$ is a wavelength of the beam emitted from the light source, d is an optical spacing between two information recording planes of the optical storage medium, and $S_1$ is an area of one sub-beam light receiving portion.

21. An optical pickup head, comprising:

a light source for emitting a light beam;

a diffracting means for creating a plurality of diffracted beams from the beam emitted from the light source;

a converging means for focusing the plurality of diffracted beams from the diffracting means onto an optical storage medium;

a beam splitting means for splitting the beams of the plurality of diffracted beams focused on the optical storage medium and reflected by the optical storage medium into two beams having different focal points; and an optical detecting means for receiving the beams split by the beam splitting means and outputting a signal corresponding to the amount of light of the received beams;

wherein the optical detecting means has main beam light receiving portions for receiving zero order diffracted beams and sub-beam light receiving portions for receiving first or higher order diffracted beams of the plurality of diffracted beams that are focused;

wherein the optical storage medium has a plurality of information recording planes, and guide grooves are formed in at least one of the information recording planes; and wherein the relationship $S_1 \cdot \eta_m \cdot R_{dfo}/(4 \cdot \pi \cdot d^2 \cdot NA^2 \cdot \eta_s \cdot R_{fo}) \leqq \alpha \leqq (Z_0/2/\Delta z)^{1/2}$ is fulfilled, and $\Delta z$ is in the range of three to ten times $\lambda/2/NA^2$, where $Z_0$ is the spacing between the two focal points given the two beams split by the beam splitting means, $\eta_m$ is a diffraction efficiency of the zero order diffracted beams and $\eta_s$ is a diffraction efficiency of the first or higher order diffracted beams of the diffracted beams created by the diffracting means, $R_{fo}$ is an effective reflectance of the focus plane of the information recording planes onto which the beams focused by the converging means are substantially focused, $R_{dfo}$ is an effective reflectance of the non-focus plane other than the focus plane of the plurality of information recording planes, NA is a numerical aperture of the optical storage medium side of the converging means, $\alpha$ is a lateral magnification of an optical system on a return path from the optical storage medium to the optical detecting means, $\lambda$ is a wavelength of the beam emitted from the light source, d is an optical spacing between two information recording planes of the optical storage medium, and $S_1$ is an area of one sub-beam light receiving portion.

22. An optical pickup head, comprising:

a light source for emitting a light beam;

a diffracting means for creating a plurality of diffracted beams from the beam emitted from the light source;

a converging means for focusing the plurality of diffracted beams from the diffracting means onto an optical storage medium;

a beam splitting means for splitting the plurality of diffracted beams focused on the optical storage medium and then reflected by the optical storage medium into two beams;

an optical detecting means for receiving the beams split by the beam splitting means and outputting a signal corresponding to the amount of light of the received beams; and an astigmatism imparting means for imparting astigmatism on the beams on their path from the optical storage medium to the optical detecting means;

wherein the optical detecting means has main beam light receiving portions for receiving zero order diffracted beams and sub-beam light receiving portions for receiving first or higher order diffracted beams of the plurality of diffracted beams that are focused;

wherein the optical storage medium has a substrate of refractive index n and a plurality of information recording planes, and guide grooves are formed in at least one of the information recording planes; and wherein the relationship $S_1 \cdot \eta_m \cdot R_{dfo}/(4 \cdot \pi \cdot d^2 \cdot NA^2 \cdot \eta_s \cdot R_{fo}) \leqq \alpha \leqq (Z_0 \cdot n^3/\Delta t/(n^2-1)/NA^2)^{1/2}$ is fulfilled, and $\Delta t$ is in the range of five to thirty times $\lambda/NA^4$, where $Z_0$ is an astigmatic difference imparted by the astigmatism imparting means, $\eta_m$ is a diffraction efficiency of the zero order diffracted beams and $\eta_s$ is a diffraction efficiency of the first or higher order diffracted beams of the diffracted beams created by the diffracting means, $R_{fo}$ is an effective reflectance of the focus plane of the information recording planes onto which the beams focused by the converging means substantially form a focal point, $R_{dfo}$ is an effective reflectance of the non-focus plane other than the focus plane of the plurality of information recording planes, NA is a numerical aperture of the optical storage medium side of the converging means, $\alpha$ is a lateral magnification of an optical system on a return path from the optical storage medium to the optical detecting means, $\lambda$ is a wavelength of the beam emitted from the light source, d is an optical spacing between two information recording planes of the optical storage medium, and $S_1$ is an area of one sub-beam light receiving portion.

23. An optical pickup head, comprising:

a light source for emitting a light beam;

a diffracting means for creating a plurality of diffracted beams from the beam emitted from the light source;

a converging means for focusing the plurality of diffracted beams from the diffracting means onto an optical storage medium;

a first beam splitting means for splitting the beams of the plurality of diffracted beams focused on the optical storage medium and reflected by the optical storage medium into two beams;

an optical detecting means for receiving the beams split by the first beam splitting means and outputting a signal corresponding to the amount of light of the received beams; and a second beam splitting means for splitting beams on an optical path from the optical storage medium to the optical detecting means into two beams of different focal points;

wherein the optical detecting means has main beam light receiving portions for receiving the zero order diffracted beams, and sub-beam light receiving portions for receiving the first or higher order diffracted beams, of the plurality of diffracted beams that are focused;

wherein the optical storage medium has a substrate of refractive index n and a plurality of information recording planes, and guide grooves are formed in at least one of the information recording planes; and wherein the relationship $S_1 \cdot \eta_m \cdot R_{dfo}/(4 \cdot \pi \cdot d^2 \cdot NA^2 \cdot \eta_s \cdot R_{fo}) \leqq \alpha \leqq (Z_0 \cdot n^3/\Delta t/(n^2-1)/NA^2)^{1/2}$ is fulfilled, and $\Delta t$ is in the range of five to thirty times $\lambda/NA^4$, where $Z_0$ is the spacing between the two focal points given the two beams split by the second beam splitting means, $\eta_m$ is a diffraction efficiency of the zero order diffracted beams and $\eta_s$ is a diffraction efficiency of the first or higher order diffracted beams of the diffracted beams created by the diffracting means, $R_{fo}$ is an effective reflectance of the focus plane of the information recording planes onto which the beams focused by the converging means substantially form a focal point, $R_{dfo}$ is an effective reflectance of the non-focus plane other than the focus plane of the plurality of information recording planes, NA is a numerical aperture of the optical storage medium side of the converging means, $\alpha$ is a lateral magnification of an optical system on a return path from the optical storage medium to the optical detecting means, $\lambda$ is a wavelength of the beam emitted by the light source, d is an optical spacing between two information recording planes of the optical storage medium, and $S_1$ is an area of one sub-beam light receiving portion.

24. An optical pickup head, comprising:

a light source for emitting a light beam;

a diffracting means for creating a plurality of diffracted beams from the beam emitted from the light source;

a converging means for focusing the plurality of diffracted beams from the diffracting means onto an optical storage medium;

a beam splitting means for splitting a plurality of beams of the plurality of diffracted beams focused on the optical storage medium and reflected by the optical storage medium; and an optical detecting means for receiving the beams split by the beam splitting means and outputting a signal corresponding to the amount of light of the received beams;

wherein the optical storage medium has a plurality of information recording planes, and guide grooves are formed in at least one of the information recording planes; and wherein the light source is formed on a substrate positioned such that it is substantially parallel to the guide grooves formed in the one or more information recording planes, and emits spontaneously emitted light from a location different from the location from which the laser beam is emitted.

25. The optical pickup head according to claim 24, wherein the substrate of the light source is made of sapphire.

26. The optical pickup head according to claim 24, wherein the substrate of the light source is made of gallium nitride.

27. An optical pickup head, comprising:

a light source for emitting a light beam;

a diffracting means for creating a plurality of diffracted beams from the beam emitted from the light source;

a converging means for focusing the plurality of diffracted beams from the diffracting means onto an optical storage medium; and an optical detecting means for receiving the beams of the plurality of diffracted beams focused on the optical storage medium and reflected by the optical storage medium and outputting a signal corresponding to the amount of light of the received beams;

wherein the optical detecting means has main beam light receiving portions for receiving zero order diffracted beams and sub-beam light receiving portions for receiving first or higher order diffracted beams of the plurality of diffracted beams that are focused; and wherein dummy light receiving portions for preventing cross-talk between the main beam light receiving portions and the sub-beam light receiving portions are provided between the main beam light receiving portions and the sub-beam light receiving portions.

28. An optical pickup head, comprising:

a light source for emitting a light beam;

a diffracting means for creating a plurality of diffracted beams from the beam emitted from the light source;

a converging means for focusing the plurality of diffracted beams from the diffracting means onto an optical storage medium; and an optical detecting means for receiving the beams of the plurality of diffracted beams focused onto the optical storage medium and reflected by the optical storage medium, and outputting a signal corresponding to the amount of light of the received beams;

wherein the optical detecting means has two main beam light receiving portions for receiving zero order diffracted beams and four sub-beam light receiving portions for receiving first or higher order diffracted beams of the plurality of diffracted beams that are focused; and wherein, when $T_1$ and $T_2$ are the signals output from the main beam light receiving portions and $T_3$, $T_4$, $T_5$, and $T_6$ are the signals output from the sub-beam light receiving portions, then tracking error signals are detected by calculating $(T_1-T_2)/(T_1+T_2)-k[\{(T_3-T_4)+(T_5-T_6)\}/(T_1+T_2)]$ (wherein k is a constant).

29. An optical pickup head, comprising:

a light source for emitting a light beam;

a diffracting means for creating a plurality of diffracted beams from the beam emitted from the light source;

a converging means for focusing the plurality of diffracted beams from the diffracting means onto an optical storage medium;

a beam branching means for branching a plurality of beams of the plurality of diffracted beams focused on the optical storage medium and reflected by the optical storage medium; and an optical detecting means for receiving the beams branched at the beam branching means and outputting a signal corresponding to the amount of light of the received beams;

wherein the optical detecting means has two light receiving portions;

wherein the optical storage medium has a first information recording plane and a second information recording plane, and guide grooves are formed in the first information recording plane; and wherein, if the diffracted beams focused by the converging means form a focal point on the first information recording plane and do not form a focal point on the second information recording plane, then tracking error signals are detected by calculating $(T_{f1}+T_{s1}-T_{f2}-T_{s2})/(T_{f1}+T_{s1}+T_{f2}+T_{s2})$ and a relationship $T_{f1}+T_{f2}\geqq 5\cdot(T_{s1}+T_{s2})$ is fulfilled, wherein $T_{f1}$ and $T_{f2}$ are signals output from the two light receiving portions when the beams reflected by the first information recording plane are received by the optical detecting means, and $T_{s1}$ and $T_{s2}$ are signals output from the two light receiving portions when the beams reflected by the second information recording plane are received by the optical detecting means.

30. The optical pickup head according to claim 1, further comprising, on the light path from the optical storage medium to the optical detecting means, a light focusing means for converging the beams received by the optical detecting means;

wherein the light focusing means comprises a convex lens and a concave lens.

31. The optical pickup head according to claim 2, further comprising, on the light path from the optical storage medium to the optical detecting means, a light focusing means for converging the beams received by the optical detecting means;

wherein the light focusing means comprises a convex lens and a concave lens.

32. The optical pickup head according to claim 3, further comprising, on the light path from the optical storage medium to the optical detecting means, a light focusing means for converging the beams received by the optical detecting means;

wherein the light focusing means comprises a convex lens and a concave lens.

33. The optical pickup head according to claim 4,
further comprising, on the light path from the optical storage medium to the optical detecting means, a light focusing means for converging the beams received by the optical detecting means;
wherein the light focusing means comprises a convex lens and a concave lens.

34. The optical pickup head according to claim 5,
further comprising, on the light path from the optical storage medium to the optical detecting means, a light focusing means for converging the beams received by the optical detecting means;
wherein the light focusing means comprises a convex lens and a concave lens.

35. The optical pickup head according to claim 6,
further comprising, on the light path from the optical storage medium to the first optical detecting means, a first light focusing means for converging the beams received by the first optical detecting means;
on the light path from the optical storage medium to the second optical detecting means, a second light focusing means for converging the beams received by the second optical detecting means;
wherein the first and second light focusing means comprise a convex lens and a concave lens respectively.

36. The optical pickup head according to claim 13,
further comprising, on the light path from the optical storage medium to the optical detecting means, a light focusing means for converging the beams received by the optical detecting means;
wherein the light focusing means comprises a convex lens and a concave lens.

37. The optical pickup head according to claim 20,
further comprising, on the light path from the optical storage medium to the optical detecting means, a light focusing means for converging the beams received by the optical detecting means;
wherein the light focusing means comprises a convex lens and a concave lens.

38. The optical pickup head according to claim 21,
further comprising, on the light path from the optical storage medium to the optical detecting means, a light focusing means for converging the beams received by the optical detecting means;
wherein the light focusing means comprises a convex lens and a concave lens.

39. The optical pickup head according to claim 22,
further comprising, on the light path from the optical storage medium to the optical detecting means, a light focusing means for converging the beams received by the optical detecting means;
wherein the light focusing means comprises a convex lens and a concave lens.

40. The optical pickup head according to claim 23,
further comprising, on the light path from the optical storage medium to the optical detecting means, a light focusing means for converging the beams received by the optical detecting means;
wherein the light focusing means comprises a convex lens and a concave lens.

41. The optical pickup head according to claim 24,
further comprising, on the light path from the optical storage medium to the optical detecting means, a light focusing means for converging the beams received by the optical detecting means;
wherein the light focusing means comprises a convex lens and a concave lens.

42. The optical pickup head according to claim 27,
further comprising, on the light path from the optical storage medium to the optical detecting means, a light focusing means for converging the beams received by the optical detecting means;
wherein the light focusing means comprises a convex lens and a concave lens.

43. The optical pickup head according to claim 28,
further comprising, on the light path from the optical storage medium to the optical detecting means, a light focusing means for converging the beams received by the optical detecting means;
wherein the light focusing means comprises a convex lens and a concave lens.

44. The optical pickup head according to claim 29,
further comprising, on the light path from the optical storage medium to the optical detecting means, a light focusing means for converging the beams received by the optical detecting means;
wherein the light focusing means comprises a convex lens and a concave lens.

45. An information recording and reproducing apparatus, comprising:
the optical pickup head according to claim 1;
a drive portion for changing a relative position between an information storage medium and the optical pickup head; and
an electric signal processing portion for receiving signals output from the optical pickup head and performing calculations to obtain desired information.

46. An information recording and reproducing apparatus, comprising:
the optical pickup head according to claim 2;
a drive portion for changing a relative position between an information storage medium and the optical pickup head; and
an electric signal processing portion for receiving signals output from the optical pickup head and performing calculations to obtain desired information.

47. An information recording and reproducing apparatus, comprising:
the optical pickup head according to claim 3;
a drive portion for changing a relative position between an information storage medium and the optical pickup head; and
an electric signal processing portion for receiving signals output from the optical pickup head and performing calculations to obtain desired information.

48. An information recording and reproducing apparatus, comprising:
the optical pickup head according to claim 4;
a drive portion for changing a relative position between an information storage medium and the optical pickup head; and
an electric signal processing portion for receiving signals output from the optical pickup head and performing calculations to obtain desired information.

49. An information recording and reproducing apparatus, comprising:
the optical pickup head according to claim 5;
a drive portion for changing a relative position between an information storage medium and the optical pickup head; and
an electric signal processing portion for receiving signals output from the optical pickup head and performing calculations to obtain desired information.

50. An information recording and reproducing apparatus, comprising:

the optical pickup head according to claim 6;

a drive portion for changing a relative position between an information storage medium and the optical pickup head; and an electric signal processing portion for receiving signals output from the optical pickup head and performing calculations to obtain desired information.

51. An information recording and reproducing apparatus, comprising:

the optical pickup head according to claim 13;

a drive portion for changing a relative position between an information storage medium and the optical pickup head; and an electric signal processing portion for receiving signals output from the optical pickup head and performing calculations to obtain desired information.

52. An information recording and reproducing apparatus, comprising:

the optical pickup head according to claim 20;

a drive portion for changing a relative position between an information storage medium and the optical pickup head; and an electric signal processing portion for receiving signals output from the optical pickup head and performing calculations to obtain desired information.

53. An information recording and reproducing apparatus, comprising:

the optical pickup head according to claim 21;

a drive portion for changing a relative position between an information storage medium and the optical pickup head; and an electric signal processing portion for receiving signals output from the optical pickup head and performing calculations to obtain desired information.

54. An information recording and reproducing apparatus, comprising:

the optical pickup head according to claim 22;

a drive portion for changing a relative position between an information storage medium and the optical pickup head; and an electric signal processing portion for receiving signals output from the optical pickup head and performing calculations to obtain desired information.

55. An information recording and reproducing apparatus, comprising:

the optical pickup head according to claim 23;

a drive portion for changing a relative position between an information storage medium and the optical pickup head; and an electric signal processing portion for receiving signals output from the optical pickup head and performing calculations to obtain desired information.

56. An information recording and reproducing apparatus, comprising:

the optical pickup head according to claim 24;

a drive portion for changing a relative position between an information storage medium and the optical pickup head; and an electric signal processing portion for receiving signals output from the optical pickup head and performing calculations to obtain desired information.

57. An information recording and reproducing apparatus, comprising:

the optical pickup head according to claim 27;

a drive portion for changing a relative position between an information storage medium and the optical pickup head; and an electric signal processing portion for receiving signals output from the optical pickup head and performing calculations to obtain desired information.

58. An information recording and reproducing apparatus, comprising:

the optical pickup head according to claim 28;

a drive portion for changing a relative position between an information storage medium and the optical pickup head; and an electric signal processing portion for receiving signals output from the optical pickup head and performing calculations to obtain desired information.

59. An information recording and reproducing apparatus, comprising:

the optical pickup head according to claim 29;

a drive portion for changing a relative position between an information storage medium and the optical pickup head; and an electric signal processing portion for receiving signals output from the optical pickup head and performing calculations to obtain desired information.

*60. An optical pickup head, comprising:*

*a light source for emitting a light beam;*

*a diffracting unit operable to create a plurality of diffracted beams from the beam emitted by the light source;*

*a converging unit operable to focus the plurality of diffracted beams from the diffracting unit onto an optical storage medium;*

*a beam branching unit operable to branch for branching a plurality of beams of the plurality of diffracted beams focused onto the optical storage medium and reflected by the optical storage medium; and*

*an optical detecting unit operable to receive the beams branched at the beam branching unit and outputting a signal corresponding to the amount of light of the received beams;*

*wherein the optical detecting unit has main beam light receiving portions for receiving zero order diffracted beams and sub-beam light receiving portions for receiving first or higher order diffracted beams of the plurality of focused diffracted beams;*

*wherein the optical storage medium has a plurality of information recording planes and guide grooves are formed in at least one of the information recording planes; and*

*wherein the amount of light of the first or higher order diffracted beams focused by the converging unit when they are substantially focused on and reflected by a focus plane of the plurality of information recording planes is equal to or greater than the amount of light of the zero order diffracted beam focused by the converging unit when it is reflected without focusing thereon by a non-focus plane other than the focus plane of the plurality of information recording planes.*

*61. An optical pickup head, comprising:*

*a light source for emitting a light beam;*

*a diffracting united operable to create a plurality of diffracted beams from the beam emitted by the light source;*

*a converging unit operable to focus the plurality of diffracted beams from the diffracting unit onto an optical storage medium;*

*a beam branching unit operable to branch a plurality of beams of the plurality of diffracted beams focused onto the optical storage medium and reflected by the optical storage medium; and*

*an optical detecting unit operable to receive the beams branched at the beam branching unit and outputting a signal corresponding to the amount of light of the received beams;*

*wherein the optical storage medium has a plurality of information recording planes, guide grooves are formed in at least one of the information recording planes, and information is recorded on the guide grooves or between the guide grooves; and*

*wherein the relationship* $10 \cdot \eta_s \geqq \eta_m$ *is fulfilled, where* $\eta_m$ *is a diffraction efficiency of a zero order diffracted beam of the diffracted beams created by the diffracting unit and* $\eta_s$ *is a diffraction efficiency of first or higher order diffracted beams.*

*62. An optical pickup head, comprising:*

*a light source for emitting a light beam;*

*a diffracting unit operable to create a plurality of diffracted beams from the beam emitted by the light source;*

*a converging unit operable to focus the plurality of diffracted beams from the diffracting unit onto an optical storage medium;*

*a beam branching unit operable to branch a plurality of beams of the plurality of diffracted beams focused onto the optical storage medium and reflected by the optical storage medium; and*

*an optical detecting unit operable to receive the beams branched at the beam branching unit and outputting a signal corresponding to the amount of light in the received beams;*

*wherein the optical detecting unit has main beam light receiving portions for receiving zero order diffracted beams and sub-beam light receiving portions for receiving first or higher order diffracted beams of the plurality of diffracted beams that are focused;*

*wherein the optical storage medium has a plurality of information recording planes, and guide grooves are formed in at least one of the information recording planes; and*

*wherein all of the sub-beam light receiving portions are arranged within the image formed on the optical detecting unit by the light of the zero order diffracted beam focused by the converging unit that is reflected without focusing by the non-focus plane of the plurality of information recording planes.*

*63. An optical pickup head, comprising:*

*a light source for emitting a light beam;*

*a diffracting unit operable to create a plurality of diffracted beams from the beam emitted by the light source;*

*a converging unit operable to focus the plurality of diffracted beams from the diffracting unit onto an optical storage medium;*

*a beam branching unit operable to branch a plurality of beams of the plurality of diffracted beams focused onto the optical storage medium and reflected by the optical storage medium; and*

*an optical detecting unit operable to receive the beams branched at the beam branching unit and outputting a signal corresponding to the amount of light of the received beams;*

*wherein the optical detecting unit has main beam light receiving portions for receiving zero order diffracted beams and sub-beam light receiving portions for receiving first or higher order diffracted beams of the plurality of diffracted beams that are focused;*

*wherein the optical storage medium has a plurality of information recording planes, and guide grooves are formed in at least one of the information recording planes; and*

*wherein the relationship* $S_1 \leqq 4 \cdot \pi \cdot (d \cdot NA \cdot \alpha)^2 \cdot \eta_s / \eta_m$ *is fulfilled, where* $\eta_m$ *is a diffraction efficiency of zero order diffracted beams of the diffracted beams created by the diffracting unit and* $\eta_s$ *is a diffraction efficiency of first or higher order diffracted beams, NA is a numerical aperture of the optical storage medium side of the converging unit,* $\alpha$ *is a lateral magnification of an optical system on a return path from the optical storage medium to the optical detecting unit, d is an optical spacing between two information recording planes of the optical storage medium, and* $S_1$ *is an area of one sub-beam light receiving portion.*

*64. An optical pickup head, comprising:*

*a light source for emitting a light beam;*

*a diffracting unit operable to create a plurality of diffracted beams from the beam emitted by the light source;*

*a converging unit operable to focus the plurality of diffracted beams from the diffracting unit onto an optical storage medium;*

*a beam branching unit operable to branch a plurality of beams of the plurality of diffracted beams focused onto the optical storage medium and reflected by the optical storage medium; and*

*an optical detecting unit operable to receive the beams branched at the beam branching unit and outputting a signal corresponding to the amount of light of the received beams;*

*wherein the optical detecting unit has main beam light receiving portions for receiving zero order diffracted beams and sub-beam light receiving portions for receiving first or higher order diffracted beams of the plurality of diffracted beams that are focused;*

*wherein the optical storage medium has a plurality of information recording planes, and guide grooves are formed in at least one of the information recording planes; and*

*wherein the relationship* $S_1 \leqq 4 \cdot \pi \cdot (d \cdot NA \cdot \alpha)^2 \cdot \eta_s / \eta_m \cdot R_{fo} / R_{dfo}$ *is fulfilled, where* $\eta_m$ *is a diffraction efficiency of zero order diffracted beams and* $\eta_s$ *is a diffraction efficiency of first or higher order diffracted beams of the diffracted beams created by the diffracting unit,* $R_{fo}$ *is an effective reflectance of the focus plane of the information recording planes onto which the beams focused by the converging unit substantially form a focal point,* $R_{dfo}$ *is an effective reflectance of a non-focus plane other than the focus plane of the plurality of information recording planes, NA is a numerical aperture of the optical storage medium side of the converging unit,* $\alpha$ *is a lateral magnification of an optical system on a return path from the optical storage medium to the optical detecting unit, d is an optical spacing between two information recording planes of the optical storage medium, and* $S_1$ *is an area of one sub-beam light receiving portion.*

*65. An optical pickup head, comprising:*

*a light source for emitting a light beam;*

*a diffracting unit operable to create a plurality of diffracted beams from the beam emitted from the light source;*

*a converging unit operable to focus the plurality of diffracted beams from the diffracting unit onto an optical storage medium;*

*a beam branching unit operable to branch a plurality of beams of the plurality of diffracted beams focused on the optical storage medium and reflected by the optical storage medium into two beams;*

*an astigmatism imparting unit operable to impart astigmatism on a first beam branched by the beam branching unit;*

*a beam splitting unit operable to further split a second beam branched by the beam branching unit into two beams;*

*a first optical detecting unit operable to receive the beam from the astigmatism imparting unit and outputting a signal corresponding to the amount of light of the received beam; and*

*a second optical detecting unit operable to receive the beams from the beam splitting unit and outputting a signal corresponding to the amount of light of the received beams;*

*wherein the optical storage medium has a plurality of information recording planes, and guide grooves are formed into at least one of the information recording planes; and*

*wherein the beam splitting unit splits the second beam in a direction parallel to the guide grooves.*

*66. An optical pickup head, comprising:*

*a light source for emitting a light beam;*

*a diffracting unit operable to create a zero order diffracted beam and first or higher order diffracted beams from the beam emitted from the light source;*

*a converging unit operable to focus the zero order diffracted beam and the first or higher order diffracted beams from the diffracting unit onto an optical storage medium;*

*a beam splitting unit operable to respectively split into two beams the zero order diffracted beam and the first or higher order diffracted beams focused on the optical storage medium and reflected by the optical storage medium; and*

*an optical detecting unit operable to receive the beams split by the beam splitting unit and outputting a signal corresponding to the amount of light of the received beams;*

*wherein the optical detecting unit has a plurality of light receiving portions positioned lined up in a row;*

*wherein the optical storage medium has a plurality of information recording planes, and guide grooves are formed in at least one of the information recording planes; and*

*wherein the beam splitting unit splits the beams with a splitting axis substantially parallel to the guide grooves.*

*67. An optical pickup head, comprising:*

*a light source for emitting a light beam;*

*a diffracting unit operable to create a plurality of diffracted beams from the beam emitted from the light source;*

*a converging unit operable to focus the plurality of diffracted beams from the diffracting unit onto an optical storage medium;*

*a beam branching unit operable to branch a plurality of beams of the plurality of diffracted beams focused on the optical storage medium and reflected by the optical storage medium;*

*an astigmatism imparting unit operable to impart astigmatism on the beams branched by the beam branching unit; and*

*an optical detecting unit operable to receive the beams imparted with astigmatism by the astigmatism imparting unit and outputting a signal corresponding to the amount of light of the received beams;*

*wherein the optical detecting unit has main beam light receiving portions for receiving zero order diffracted beams and sub-beam light receiving portions for receiving first or higher order diffracted beams of the plurality of diffracted beams that are focused;*

*wherein the optical storage medium has a plurality of information recording planes, and guide grooves are formed in at least one of the information recording planes; and*

*wherein the relationship* $S_1 \cdot \eta_m \cdot R_{dfo}/(4 \cdot \pi \cdot d^2 \cdot NA^2 \cdot \eta_s \cdot R_{fo}) \leqq \alpha \leqq (Z_0/2/\Delta z)^{1/2}$ *is fulfilled, and* $\Delta z$ *is in the range of three to ten times* $\lambda/2/NA^2$*, where* $Z_0$ *is an astigmatic difference imparted by the astigmatism imparting unit,* $\eta_m$ *is a diffraction efficiency of the zero order diffracted beams and* $\eta_s$ *is a diffraction efficiency of the first or higher order diffracted beams of the diffracted beams created by the diffracting unit,* $R_{fo}$ *is an effective reflectance of the focus plane of the information recording planes onto which the beams focused by the converging unit are substantially focused,* $R_{dfo}$ *is an effective reflectance of the non-focus plane other than the focus plane of the plurality of information recording planes, NA is a numerical aperture of the optical storage medium side of the converging unit,* $\alpha$ *is a lateral magnification of an optical system on a return path from the optical storage medium to the optical detecting unit,* $\lambda$ *is a wavelength of the beam emitted from the light source, d is an optical spacing between two information recording planes of the optical storage medium, and* $S_1$ *is an area of one sub-beam light receiving portion.*

*68. An optical pickup head, comprising:*

*a light source for emitting a light beam;*

*a diffracting unit operable to create a plurality of diffracted beams from the beam emitted from the light source;*

*a converging unit operable to focus the plurality of diffracted beams from the diffracting unit onto an optical storage medium;*

*a beam splitting unit operable to split the beams of the plurality of diffracted beams focused on the optical storage medium and reflected by the optical storage medium into two beams having different focal points; and*

*an optical detecting unit operable to receive the beams split by the beam splitting unit and outputting a signal corresponding to the amount of light of the received beams;*

*wherein the optical detecting unit has main beam light receiving portions for receiving zero order diffracted beams and sub-beam light receiving portions for receiving first or higher order diffracted beams of the plurality of diffracted beams that are focused;*

*wherein the optical storage medium has a plurality of information recording planes, and guide grooves are formed in at least one of the information recording planes; and*

*wherein the relationship* $S_1 \cdot \eta_m \cdot R_{dfo}/(4 \cdot \pi \cdot d^2 \cdot NA^2 \cdot \eta_s \cdot R_{fo}) \leqq \alpha \leqq (Z_0/2/\Delta z)^{1/2}$ *is fulfilled, and* $\Delta z$ *is in the range of three to ten times* $\lambda/2/NA^2$*, where* $Z_0$ *is the spacing between the two focal points given the two beams split by the beam splitting unit,* $\eta_m$ *is a diffraction efficiency of the zero order diffracted beams and* $\eta_s$ *is a diffraction efficiency of the first or higher order diffracted beams of the diffracted beams created by the diffracting unit,* $R_{fo}$ *is an effective reflectance of the focus plane of the information recording planes onto which the beams focused by the converging unit are substantially focused,* $R_{dfo}$ *is an effective*

*reflectance of the non-focus plane other than the focus plane of the plurality of information recording planes, NA is a numerical aperture of the optical storage medium side of the converging unit, α is a lateral magnification of an optical system on a return path from the optical storage medium to the optical detecting unit, λ is a wavelength of the beam emitted from the light source, d is an optical spacing between two information recording planes of the optical storage medium, and $S_1$ is an area of one sub-beam light receiving portion.*

*69. An optical pickup head, comprising:*

*a light source for emitting a light beam;*

*a diffracting unit operable to create a plurality of diffracted beams from the beam emitted from the light source;*

*a converging unit operable to focus the plurality of diffracted beams from the diffracting unit onto an optical storage medium;*

*a beam splitting unit operable to split the plurality of diffracted beams focused on the optical storage medium and then reflected by the optical storage medium into two beams;*

*an optical detecting unit operable to receive the beams split by the beam splitting unit and outputting a signal corresponding to the amount of light of the received beams; and*

*an astigmatism imparting unit operable to impart astigmatism on the beams on their path from the optical storage medium to the optical detecting unit;*

*wherein the optical detecting unit has main beam light receiving portions for receiving zero order diffracted beams and sub-beam light receiving portions for receiving first or higher order diffracted beams of the plurality of diffracted beams that are focused;*

*wherein the optical storage medium has a substrate of refractive index n and a plurality of information recording planes, and guide grooves are formed in at least one of the information recording planes; and*

*wherein the relationship* $S_1 \cdot \eta_m \cdot R_{dfo}/(4 \cdot \pi \cdot d^2 \cdot NA^2 \cdot \eta_s \cdot R_{fo}) \leqq \alpha \leqq (Z_0 \cdot n^3/\Delta t/(n^2-1)/NA^2)^{1/2}$ *is fulfilled, and Δt is in the range of five to thirty times* $80/NA^4$, *where* $Z_0$ *is an astigmatic difference imparted by the astigmatism imparting unit,* $\eta_m$ *is a diffraction efficiency of the zero order diffracted beams and* $\eta_s$ *is a diffraction efficiency of the first or higher order diffracted beams of the diffracted beams created by the diffracting unit,* $R_{fo}$ *is an effective reflectance of the focus plane of the information recording planes onto which the beams focused by the converging unit substantially form a focal point,* $R_{dfo}$ *is an effective reflectance of the non-focus plane other than the focus plane of the plurality of information recording planes, NA is a numerical aperture of the optical storage medium side of the converging unit, α is a lateral magnification of an optical system on a return path from the optical storage medium to the optical detecting unit, λ is a wavelength of the beam emitted from the light source, d is an optical spacing between two information recording planes of the optical storage medium, and* $S_1$ *is an area of one sub-beam light receiving portion.*

*70. An optical pickup head, comprising:*

*a light source for emitting a light beam;*

*a diffracting unit operable to create a plurality of diffracted beams from the beam emitted from the light source;*

*a converging unit operable to focus the plurality of diffracted beams from the diffracting unit onto an optical storage medium;*

*a first beam splitting unit operable to split the beams of the plurality of diffracted beams focused on the optical storage medium and reflected by the optical storage medium into two beams;*

*an optical detecting unit operable to receive the beams split by the first beam splitting unit and outputting a signal corresponding to the amount of light of the received beams; and*

*a second beam splitting unit operable to split beams on an optical path from the optical storage medium to the optical detecting unit into two beams of different focal points;*

*wherein the optical detecting unit has main beam light receiving portions for receiving the zero order diffracted beams, and sub-beam light receiving portions for receiving the first or higher order diffracted beams, of the plurality of diffracted beams that are focused;*

*wherein the optical storage medium has a substrate of refractive index n and a plurality of information recording planes, and guide grooves are formed in at least one of the information recording planes; and*

*wherein the relationship* $S_1 \cdot \eta_m \cdot R_{dfo}/(4 \cdot \pi \cdot d^2 \cdot NA^2 \cdot \eta_s \cdot R_{fo}) \leqq \alpha \leqq (Z_0 \cdot n^3/\Delta t/(n^2-1)/NA^2)^{1/2}$ *is fulfilled, and Δt is in the range of five to thirty times* $\lambda/NA^4$, *where* $Z_0$ *is the spacing between the two focal points given the two beams split by the second beam splitting unit,* $\eta_m$ *is a diffraction efficiency of the zero order diffracted beams and* $\eta_s$ *is a diffraction efficiency of the first or higher order diffracted beams of the diffracted beams created by the diffracting unit,* $R_{fo}$ *is an effective reflectance of the focus plane of the information recording planes onto which the beams focused by the converging unit substantially form a focal point,* $R_{dfo}$ *is an effective reflectance of the non-focus plane other than the focus plane of the plurality of information recording planes, NA is a numerical aperture of the optical storage medium side of the converging unit, α is a lateral magnification of an optical system on a return path from the optical storage medium to the optical detecting unit, λ is a wavelength of the beam emitted by the light source, d is an optical spacing between two information recording planes of the optical storage medium, and* $S_1$ *is an area of one sub-beam light receiving portion.*

*71. An optical pickup head, comprising:*

*a light source for emitting a light beam;*

*a diffracting unit operable to create a plurality of diffracted beams from the beam emitted from the light source;*

*a converging unit operable to focus the plurality of diffracted beams from the diffracting unit onto an optical storage medium;*

*a beam splitting unit operable to split a plurality of beams of the plurality of diffracted beams focused on the optical storage medium and reflected by the optical storage medium; and*

*an optical detecting unit operable to receive the beams split by the beam splitting unit and outputting a signal corresponding to the amount of light of the received beams;*

*wherein the optical storage medium has a plurality of information recording planes, and guide grooves are formed in at least one of the information recording planes; and*

*wherein the light source is formed on a substrate positioned such that it is substantially parallel to the guide grooves formed in the one or more information record-*

*ing planes, and emits spontaneously emitted light from a location different from the location from which the laser beam is emitted.*

*72. An optical pickup head, comprising:*

*a light source for emitting a light beam;*

*a diffracting unit operable to create a plurality of diffracted beams from the beam emitted from the light source;*

*a converging unit operable to focus the plurality of diffracted beams from the diffracting unit onto an optical storage medium; and*

*an optical detecting unit operable to receive the beams of the plurality of diffracted beams focused onto the optical storage medium and reflected by the optical storage medium, and outputting a signal corresponding to the amount of light of the received beams;*

*wherein the optical detecting unit has two main beam light receiving portions for receiving zero order diffracted beams and four sub-beam light receiving portions for receiving first or higher order diffracted beams of the plurality of diffracted beams that are focused; and*

*wherein, when* $T_1$ *and* $T_2$ *are the signals output from the main beam light receiving portions and* $T_3$, $T_4$, $T_5$, *and* $T_6$ *are the signals output from the sub-beam light receiving portions, then tracking error signals are detected by calculating* $(T_1-T_2)/(T_1+T_2)-k[\{(T_3-T_4)+(T_5-T_6)\}/(T_1+T_2)]$ *(wherein k is a constant).*

*73. An optical pickup head, comprising:*

*a light source for emitting a light beam;*

*a diffracting unit operable to create a plurality of diffracted beams from the beam emitted from the light source;*

*a converging unit operable to focus the plurality of diffracted beams from the diffracting unit onto an optical storage medium;*

*a beam branching unit operable to branch a plurality of beams of the plurality of diffracted beams focused on the optical storage medium and reflected by the optical storage medium; and*

*an optical detecting unit operable to receive the beams branched at the beam branching unit and outputting a signal corresponding to the amount of light of the received beams;*

*wherein the optical detecting unit has two light receiving portions;*

*wherein the optical storage medium has a first information recording plane and a second information recording plane, and guide grooves are formed in the first information recording plane; and*

*wherein, if the diffracted beams focused by the converging unit form a focal point on the first information recording plane and do not form a focal point on the second information recording plane, then tracking error signals are detected by calculating* $(T_{f1}+T_{s1}-T_{f2}-T_{s2})/(T_{f1}+T_{s1}+T_{f2}+T_{s2})$ *and a relationship* $T_{f1}+T_{f2}\geqq 5\cdot(T_{s1}+T_{s2})$ *is fulfilled, wherein* $T_{f1}$ *and* $T_{f2}$ *are signals output from the two light receiving portions when the beams reflected by the first information recording plane are received by the optical detecting unit, and* $T_{s1}$ *and* $T_{s2}$ *are signals output from the two light receiving portions when the beams reflected by the second information recording plane are received by the optical detecting unit.*

* * * * *

UNITED STATES PATENT AND TRADEMARK OFFICE

CERTIFICATE OF CORRECTION

PATENT NO. : RE43,126 E
APPLICATION NO. : 11/529689
DATED : January 24, 2012
INVENTOR(S) : Hayashi et al.

It is certified that error appears in the above-identified patent and that said Letters Patent is hereby corrected as shown below:

Title page, (30) Foreign Application Priority Data: "2001-104425" should be -- 2002-104425 --.
Title page, (56) Reference Cited: insert -- . -- after "Kume et al".

Column 32, line 18 (claim 5): "$S_1 \geq$" should be -- $\mathbf{S_1} \leq$ --.
Column 47, line 42 (claim 69): "$80/NA^4$" should be -- $\boldsymbol{\lambda/NA^4}$ --.

Signed and Sealed this
Seventh Day of August, 2012

David J. Kappos

David J. Kappos
*Director of the United States Patent and Trademark Office*